United States Patent [19]
Vanderah et al.

[11] Patent Number: 5,339,425
[45] Date of Patent: Aug. 16, 1994

[54] OPERATING SYSTEM FOR A PROCESS CONTROLLER

[75] Inventors: Richard J. Vanderah; John G. Kern, both of Marshalltown, Iowa

[73] Assignee: Fisher Controls International, Inc., Clayton, Mo.

[21] Appl. No.: 172,867

[22] Filed: Dec. 22, 1993

Related U.S. Application Data

[63] Continuation of Ser. No. 622,937, Dec. 11, 1990, abandoned.

[51] Int. Cl.$^5$ .............................................. G06F 9/46
[52] U.S. Cl. ................................... 395/700; 395/650; 395/725; 364/DIG. 1; 364/281.3; 364/281.8; 364/231.6; 364/221.5
[58] Field of Search ................... 395/700, 650, 725; 364/DIG. 1

[56] References Cited

U.S. PATENT DOCUMENTS

| | | | |
|---|---|---|---|
| 4,393,465 | 7/1983 | Rotash | 364/900 |
| 4,780,631 | 10/1988 | Gröninger | 310/71 |
| 4,819,149 | 4/1989 | Sanik et al. | 364/132 |
| 4,954,948 | 9/1990 | Hira et al. | 364/200 |
| 4,969,120 | 11/1990 | Azevedo et al. | 364/900 |

FOREIGN PATENT DOCUMENTS

| | | |
|---|---|---|
| 0196032 | 10/1986 | European Pat. Off. . |
| 0352683 | 1/1990 | European Pat. Off. . |
| 89/06389 | 1/1989 | PCT Int'l Appl. . |

OTHER PUBLICATIONS

Milenkovic, Milan "Operating Systems, Concepts and Design", McGraw Hill, New York, 1987.
"HP 48000 RTU Measurement and Control Unit", a 28-page brochure.
"Integrating the 48000 Into Your System", Hewlett Packard manual, pp. 3-1 through 3-22 and pp. 6-21 through 6-23a.
Fisher Controls instruction manual entitled "Type ROC200 Remote Operational Controller (ROC)," dated Jul., 1989, pp. 1.1 through 3.10
"Type ROC001 Remote Operations Base Firmware," a specification sheet relating to the ROC200.
"Type ROC200 Remote Operations AGA Flow Firmware," a specification sheet relating to the ROC200.
"Type ROC044 Remote Operations PID Control Firmware," a specification sheet relating to the ROC200.
"Intelligent Multiplexers Improve Host Capacity and Safety," Oct., 1990, *Control Engineering*.
"Serial Multiplexer Plus Radio Modems Enable Pumping Stations to Run Reliably, Reduce Costs," Sep./Oct., 1990, *Waterworld News*.
"Monitoring Emissions With a PC," Sep., 1990, *Control*.
"I/OPLEXER—The Smart Solution—Quick Reference Card v 3.1," a duTec technical document.
A duTec 2-sided price list.
A 2-sided, color brochure regarding duTec's I/O-PLEXER.
Fisher Controls user manual entitled "ROC200 Remote Operations Controller," dated Sep., 1990, pp. 1-1 through Appendix A.

*Primary Examiner*—Gareth D. Shaw
*Assistant Examiner*—A. Katbab
*Attorney, Agent, or Firm*—Marshall, O'Toole, Gerstein, Murray & Borun

[57] ABSTRACT

A controller of the type used in process control includes a plurality of modular I/O units. The I/O units includes I/O circuits which may be of four basic types: digital input circuits, digital output circuit, analog input circuits and analog output circuits. The controller is microprocessor-controlled and has an operating system that controls the performance of a number of tasks relating to the control of a plurality of I/O devices to which the controller is connected. Each of the tasks is allocated to one of a plurality of successive time slots, and each task is performed during its associated time slot. The controller includes a priority routine for determining which of the tasks should be performed in each of the time slots. If a task is not completely performed during the time slot to which the task is allocated, the current status of the task is saved to memory so that the task can be completed during a subsequent time slot. If a task is completely performed during its allocated time slot, then one or more unfinished tasks can be performed during that time slot.

28 Claims, 18 Drawing Sheets

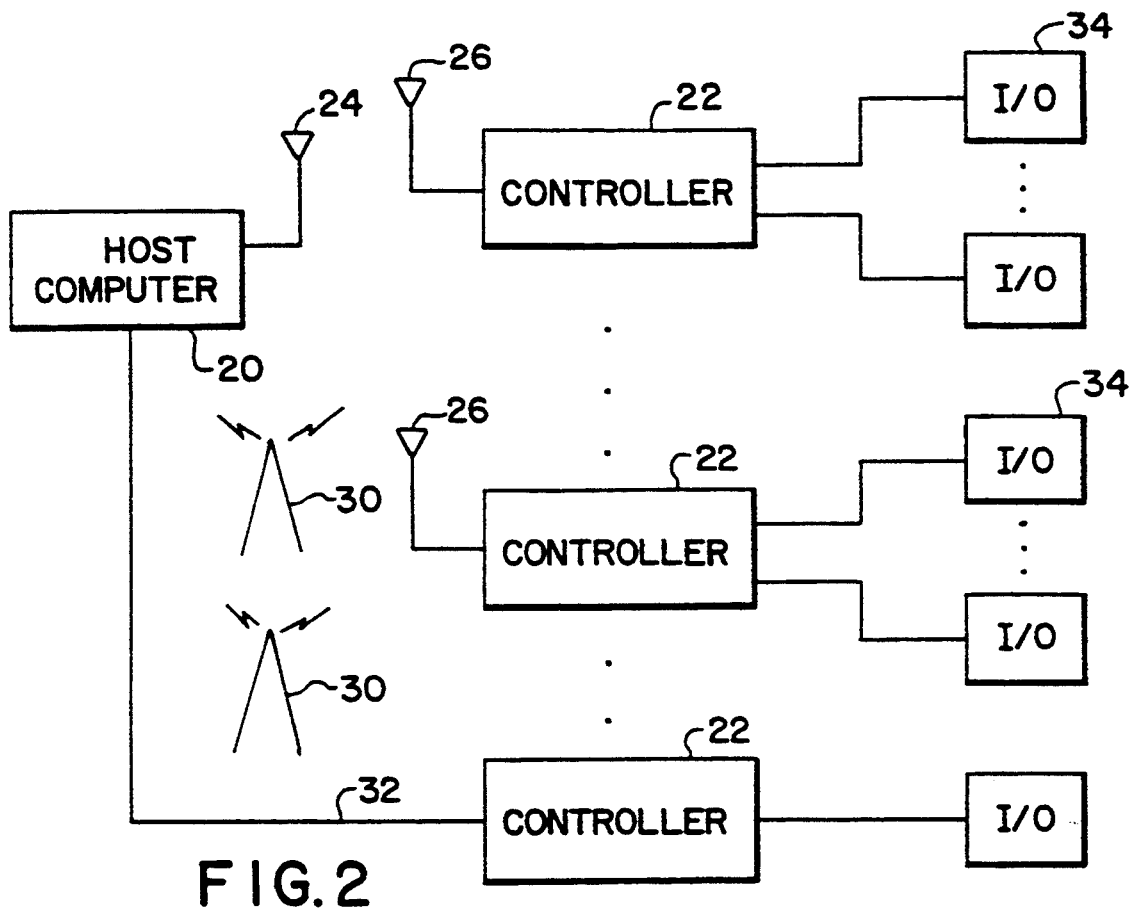
FIG. 2
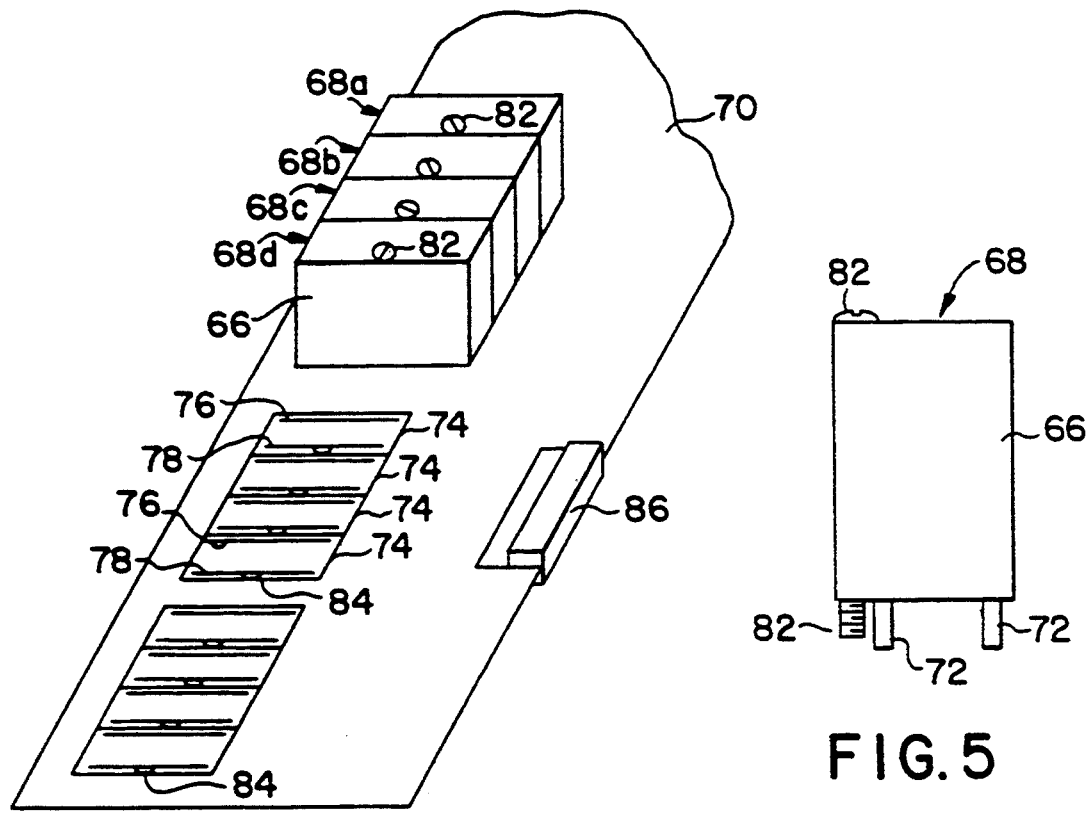
FIG. 4
FIG. 5

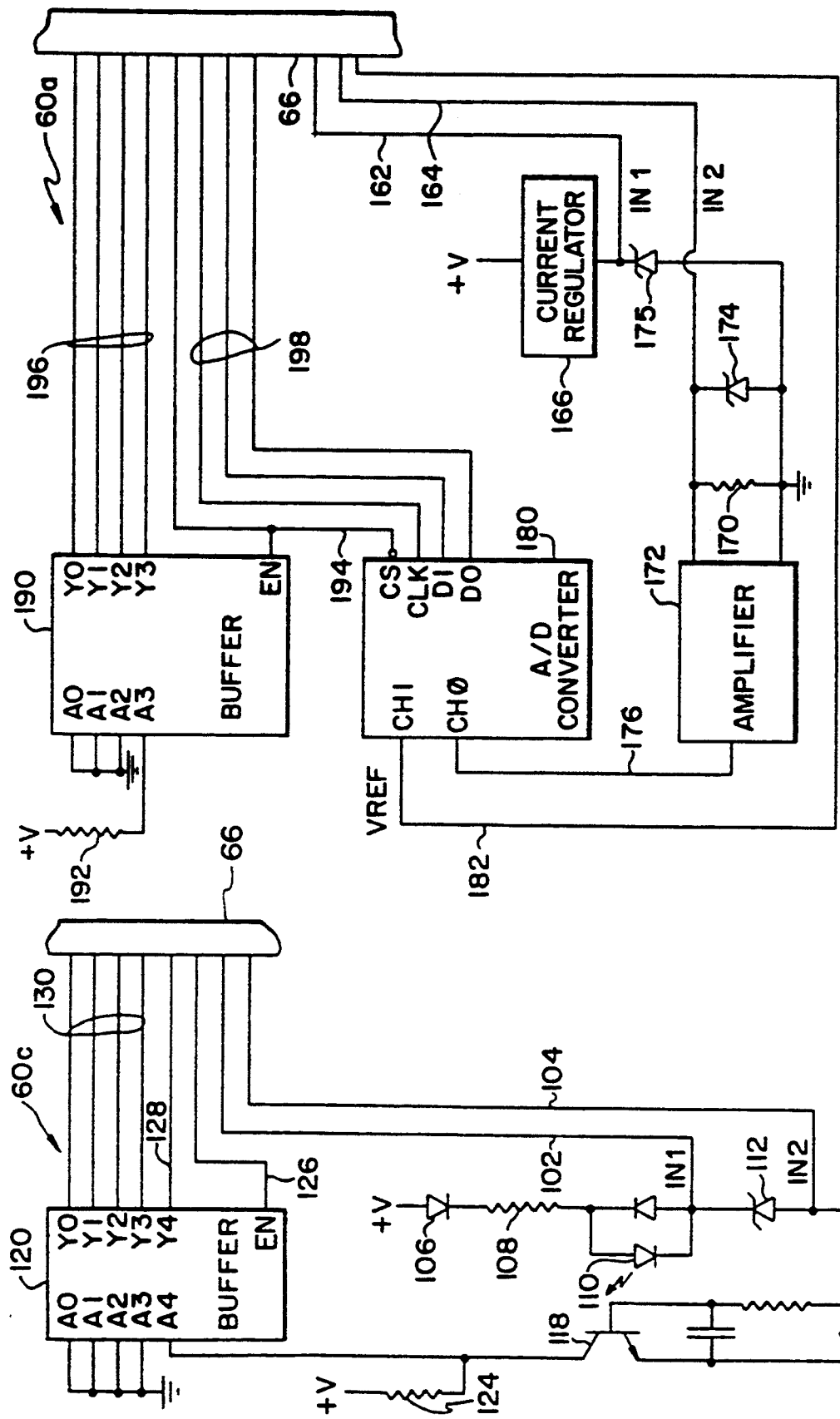

FIG. 12a TIME SLOT ALLOCATION

| Slot | |
|---|---|
| SLOT 1 | I/O |
| SLOT 2 | SYSTEM |
| SLOT 3 | COMM. |
| SLOT 4 | DATABASE |
| SLOT 5 | USER |
| SLOT 6 | I/O |
| SLOT 7 | SYSTEM |
| SLOT 8 | PROCESS |
| SLOT 9 | FLOW |
| SLOT 10 | FLOW |

FIG. 12b OPERATION EXAMPLE 1

| Slot | |
|---|---|
| SLOT 3 | COMM. |
| SLOT 4 | DATABASE |
| SLOT 5 | USER / COMM. |

FIG. 12c OPERATION EXAMPLE 2

| Slot | |
|---|---|
| SLOT 3 | COMM. |
| SLOT 4 | DATABASE |
| SLOT 5 | USER / COMM. / DATABASE |

FIG. 12d OPERATION EXAMPLE 3

| Slot | |
|---|---|
| SLOT 1 | I/O / I/O |
| SLOT 2 | SYSTEM |
| SLOT 3 | COMM. / SYSTEM |

OPERATING SYSTEM FOR A PROCESS CONTROLLER

This application is a continuation of U.S. Ser. No. 07/622,937 filed Dec. 11, 1990, now abandoned.

BACKGROUND OF THE INVENTION

The present invention relates to a unique operating system for a process controller.

Process controllers are used to perform a variety of functions including process control functions and data-gathering functions. Process control functions include the monitoring of various conditions, such as liquid and gas pressures, flows, temperatures, etc., and responding to the state of the conditions by selectively activating pumps, valves, etc. to control the monitored conditions. The process control functions relate to such applications as oil and natural gas production and distribution, industrial plant control, etc. The data-gathering functions of process controllers allow a historical record of data relating to such variables as pressures or flows to be made over an extended period of time, such as several weeks or months, for example.

Typically, a number of process controllers are used in a computer system or network having a central host computer. For example, a single host computer may communicate with as few as 10 to more than 100 process controllers.

A process controller typically has a number of input/output (I/O) circuits which may be of four basic types: a digital input circuit, a digital output circuit, an analog input circuit, and an analog output circuit. The digital I/O circuits are used to monitor and control conditions and/or devices having only two states, on and off for example. The analog I/O circuits are used where the condition or device has many states. For example, an analog input circuit may be used to input the temperature of a liquid in a tank to the process controller, and an analog output circuit may be used to control the position of a valve having many positions.

The operating system of a conventional process controller may be a multi-tasking system that performs a number of different tasks at one or more desired rates or intervals. A flowchart of a prior art operating system for a process controller is shown in FIG. 1. Referring to FIG. 1, the operating system performs a number of tasks, which may be implemented as one or more computer program routines executed by a microprocessor. These tasks include a system task 1 that performs various conventional system functions such as a watchdog timer function, etc. A database task 2 is executed to update the database stored in the process controller. A process task 3 is performed to periodically make calculations relating to the control one or more processes under the control of the process controller. This control may be conventional PID control, for example.

The tasks 4–7 relate to the communication between the microprocessor of the process controller and the I/O circuits inside the process controller. A read digital inputs (DIS) task 4 causes the process controller to read the digital value input to each of its DI circuits. A read analog inputs (AIS) task 5 causes the process controller to read the analog value input to each of its AI circuits. A write digital outputs (DOS) task 6 causes the process controller to write a digital output value to each of its DO circuits. Finally, a write analog outputs (AOS) task 7 causes the I/O controller to write an analog output value to each of its AO circuits.

A communication task 8 is executed to perform communication between the process controller and the host computer. Communication may also be performed with other devices. A compute flow task 9 may be performed to make flow calculations for particular applications.

The tasks generally described above are probably performed by most conventional process controllers since they define the basic operation of such a controller. However, all of the tasks must be performed in such a manner as to minimize the period of time between each successive execution of each of the tasks.

The operating system of FIG. 1 functions in the following manner. Each of the tasks 1–9 is broken up into a sequence of "micro-tasks." For example, the system task 1 might be subdivided into 20 such micro-tasks. The operating system performs one micro-task in each of the tasks 1–9 at a time. Thus, the operating system begins by performing the first micro-task of each of the tasks 1–9 in that order, and then the second micro-task in each of the tasks 1–9, and so on.

The detailed operation of the system of FIG. 1 begins at step 10, where the value of a flag TICK is tested to determine whether it is 1. The TICK flag is set to 1 by a software counter every 10 milliseconds (ms). If TICK is 1, the program branches to step 11 where a TASK variable is set to 1. The TASK variable stores the number of the current task, for example one of the numbers 1–9 for the tasks 1–9 shown, for which a micro-task is to be performed. At step 12, the value of the TASK variable is tested to determine whether the micro-task for the last task (TASK=9) has been performed. If that micro-task has been performed, the program branches to step 13 where the value of the TICK flag is set to 0. The program then branches to step 10 where it waits until the software counter sets the TICK flag to 1 at the next 10 ms interval.

If the micro-task for the last task has not yet been performed as determined by step 12, the program branches to step 14 where a timer for the current task is tested to determine whether it is 0. Each of the nine tasks has such a timer. The timer controls how often each of the tasks is to be performed. Upon the completion of each task, its associated timer is initialized to a predetermined value depending upon how often that task should be performed. The value stored in the timer is decremented by 1 each time the software counter sets the TICK flag to 1. Thus, to perform a task most frequently, the timer associated with that task would be initialized to one, whereas to perform a task infrequently, its timer would be set to a relatively large number, such as 200.

If the timer associated with the current task is zero, indicating that it is time to perform a micro-task for that task, the program branches to the current task, as determined by the value of the TASK variable. After performing a micro-task for that task, the program branches to step 15, where the current value of the TASK variable is incremented by one. Steps 12 and 14 are then repeated until a micro-task has been performed for each of the tasks 1–9. At that point, the program branches step 10. The program continues to repeat in the manner described above to perform successive micro-tasks for each of the tasks 1–9.

As should be appreciated from the above description, the operating system executes all of tasks "in parallel,"

since portions of all of the tasks are performed each time the TICK flag is set to 1.

Although the operating system described generally above is satisfactory, it has a number of disadvantages. One disadvantage is that an undue amount of time is wasted during the waiting step 10. In particular, the operating system was designed so that the combined execution time of nine micro-tasks, one micro-task for each of the tasks 1–9, would be slightly less than 10 ms, 9.5 ms for example. Thus, the program would only wait at step 10 for 0.5 ms since the TICK flag is set to 1 every 10 ms. However, the execution time of the micro-tasks of the main tasks 1–9 is somewhat unpredictable. As a result, in some cases the total execution time is greater than 10 ms, 10.5 ms for example. In this case, the program would have to wait at step 10 for 9.5 ms before the TICK flag was set to 1 by the next tick of the 10 ms software counter. This waiting period would represent nearly 50% of the total execution time, a significant waste of time.

Another disadvantage of the above operating system is that a large amount of overhead and system housekeeping are required to execute each task due to the nature of the execution. In particular, the execution of each of the tasks by intermittently performing a number of micro-tasks requires an unduly complicated computer program which takes longer to execute and requires more memory for storage. Another disadvantage of the above system is that it lacks flexibility in assigning priority to each of the tasks.

SUMMARY OF THE INVENTION

The present invention is directed to a process controller that can communicate with a plurality of I/O devices. The controller has an operating system that controls the performance of a plurality of tasks related to the control of the I/O devices. The operating system generates a plurality of successive time slots, or time periods. Each of the tasks that is to be performed is allocated to one or more of the time slots.

During each successive time slot, the controller generally performs the task allocated to that time slot. The duration of the time slots is selected so that each task is usually completely performed during its associated time slot. However, if a task is not completed during its associated time slot, the current status of the task and the data related thereto is saved to a memory portion dedicated exclusively to that task. As a result, the operation of the task may be resumed at a later time from the point at which it was interrupted.

If a task is completely performed during its associated time slot, then the controller determines whether there are any unfinished tasks. If there is an unfinished task, that task is completed during the same time slot. If there is more than one unfinished task, the controller may determine which of the unfinished tasks has higher priority and may then finish that task. If there is sufficient time remaining in a time slot, more than one unfinished task may be completed.

The controller may also include means for assigning a higher priority to one or more of the tasks. As a result, if the task to which the higher priority has been assigned is not completed during its allocated time slot, it can be immediately completed at the start of the next time slot, thereby preempting the lower priority task that was allocated to that time slot. As a result, the higher priority task is always completed during its allocated time slot or shortly thereafter.

These and other features and advantages of the present invention will be apparent to those of ordinary skill in the art in view of the detailed description of the preferred embodiment, which is made with reference to the drawings, a brief description of which is provided below.

BRIEF DESCRIPTION OF THE DRAWINGS

FIG. 2 illustrates a communication system having a host computer and a plurality of process controllers;

FIG. 4 is an I/O board for a process controller having four modular I/O units connected thereto;

FIG. 5 is a side view of a modular I/O unit;

FIG. 6 is a circuit diagram of a digital input circuit shown schematically in FIG. 3;

FIG. 7 is a circuit diagram of an analog input circuit shown schematically in FIG. 3;

FIG. 12a illustrates the allocation of a number of tasks to a number of time slots;

FIGS. 12b–12d illustrate several examples of the operation of the process controller;

DETAILED DESCRIPTION OF THE PREFERRED EMBODIMENTS

Figure 1:
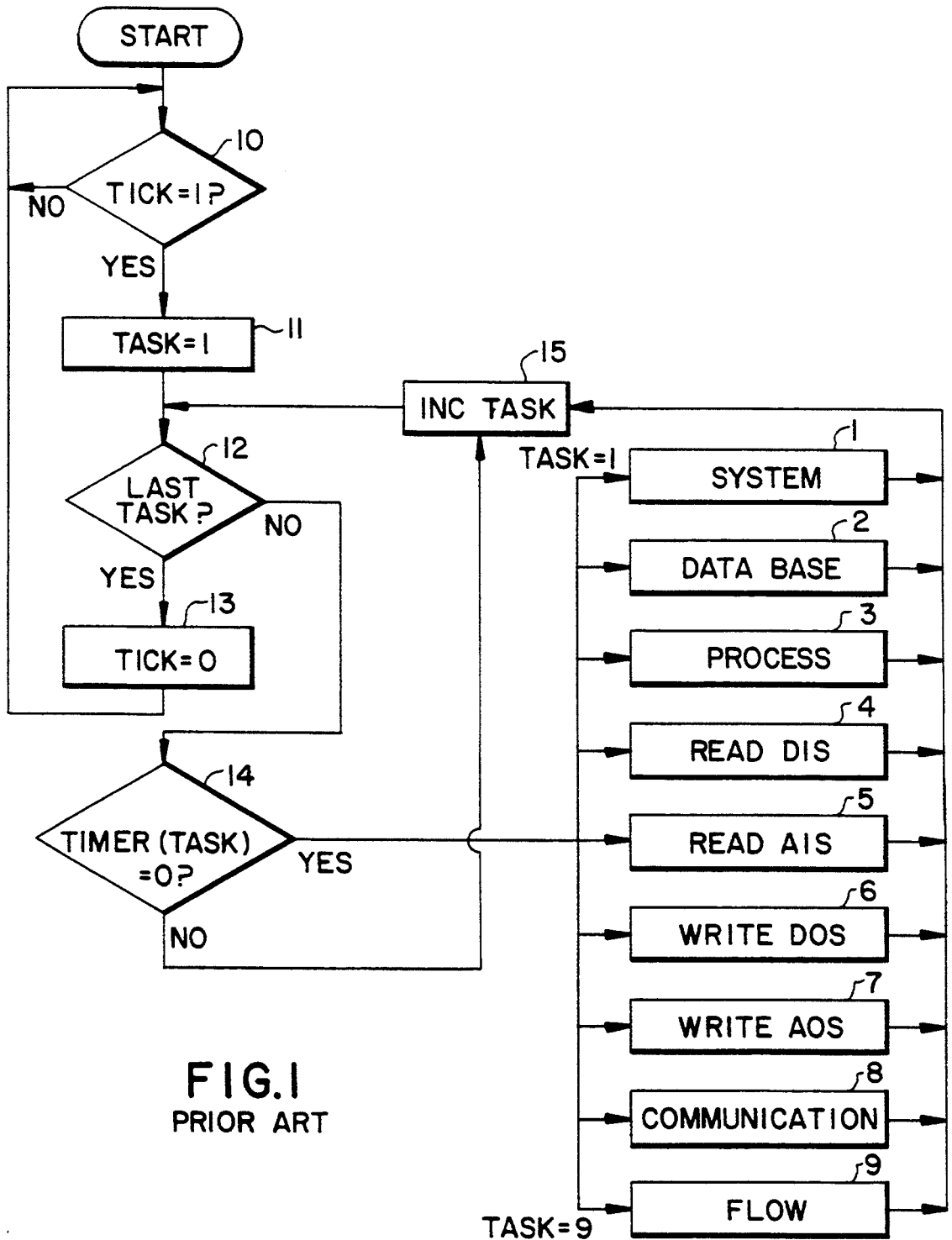
FIG. 1 is a flow chart of a prior art operating system for a process controller.

A communication system is illustrated in FIG. 2. The communication system includes a host computer 20 and a plurality of process controllers 22 at a number of locations remote from the computer 20. The host computer 20 periodically communicates with each of the controllers 22 via radio communication. To this end, the host computer 20 has an antenna 24 and the controllers 22 have antennas 26. In order to enhance radio communication, the communication system may include a plurality of radio repeaters 30. Instead of utilizing radio communication, the communication system may use other types of communication links, such as a telephone line 32 interconnecting the host computer 20 with the controllers 22.

The controllers 22 are connected to a plurality of I/O devices 34. The I/O devices 34 may be any type of devices that are either driven by analog or digital signals or that sense conditions and generate analog or digital signals in response to the conditions sensed. Examples of I/O devices include pumps which may be turned on or off, valves the positions of which are incrementally variable, temperature, pressure, and flow transducers, etc.

In operation, each of the controllers 22 communicates with the I/O devices 34 to which it is connected to control the process for which that controller is used. As a simple example, one of the controllers 22 may be connected to two I/O devices 34, one being a fluid level transducer (not shown) for sensing the level of fluid within a tank and the other being a valve (not shown) within a pipeline connected to the tank. The fluid level transducer would generate and transmit to the controller 22 an analog input signal, and the controller 22 would control the level of fluid within the tank by sending an analog output signal to the valve to control the position of the valve. Such control could be any type of conventional control, such as proportional (P) control, proportional-plus-integral (PI) control, or proportional-/integral/derivative (PID) control.

In addition to performing process control functions, the controllers 22 perform data-gathering functions by storing various data in memory. Such data might include the magnitude of the tank fluid levels over a predetermined period of time.

The controllers 22 periodically communicate with the host computer 20. This periodic communication may relate to the control of the I/O devices 34, or it may be for the purpose of gathering data from the controllers 22 for storage in the host computer 20.

Figure 3:
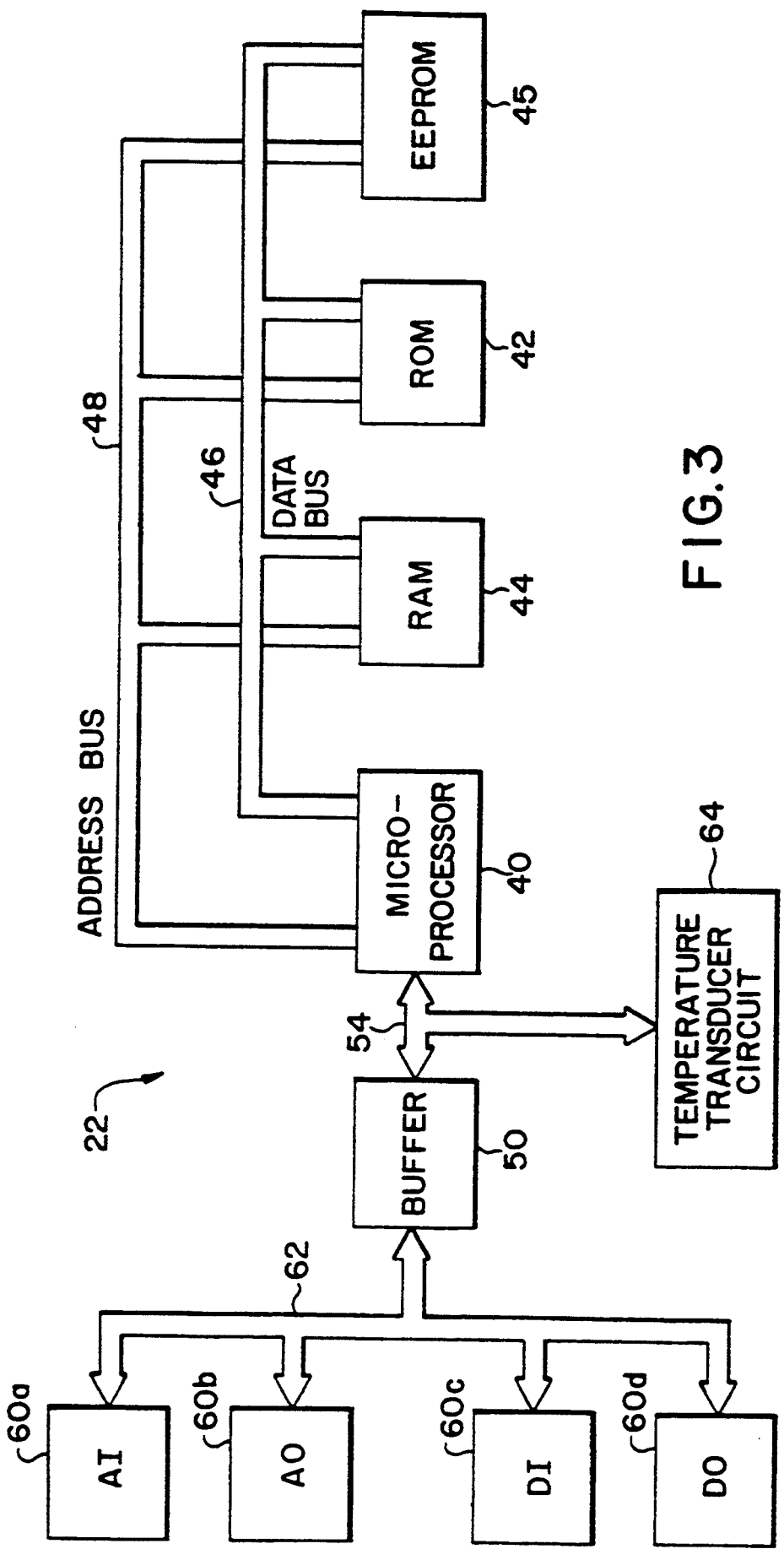
FIG. 3 is a block diagram of a process controller shown schematically in FIG. 2.

A block diagram of the electronics of one of the process controllers 22 is illustrated in FIG. 3. The overall operation of the controller 22 is controlled by a microprocessor 40 which executes a computer program stored in a read-only memory (ROM) 42. The microprocessor 40 and the ROM 42 are connected to a random-access memory (RAM) 44 and an EEPROM 45 by means of a data bus 46 and an address bus 48. The RAM 44 functions as general purpose memory and also may be used to store historical data generated by the I/O devices 34. Alternatively, historical data may be stored in a removable memory module like the one described in a patent application entitled, "Process Controller With Removable Memory Module," U.S. Ser. No. 07/622,938 filed Dec. 11, 1990, the disclosure of which is incorporated herein by reference. The RAM 44, which is a volatile memory, may be backed up by one or more batteries so that data is not lost in the event of a power failure. The EEPROM 45, which is a nonvolatile memory, may be used to store system initialization and/or configuration data.

The microprocessor 40 is connected to a bidirectional buffer 50 via a bidirectional bus 54. The buffer 50 is connected to a plurality of I/O circuits 60 via a bidirectional bus 62. Although only four I/O circuits 60 are shown in FIG. 3, there would be at least one I/O circuit 60 for each of the I/O devices 34 to which the controller 22 was connected. FIG. 3 illustrates the four basic types of I/O circuits, which include an analog input (AI) circuit 60a, an analog output (AO) circuit 60b, a digital input (DI) circuit 60c, and a digital output (DO) circuit 60d. A temperature transducer circuit 64 is connected to the bus 54. As described in more detail below, the microprocessor 40 compensates the analog value generated by the analog input circuit 60a based upon the analog temperature value supplied by the transducer circuit 64.

The manner in which the I/O circuits 60 are structurally implemented in the controller 22 is illustrated in FIG. 4. Each of the I/O circuits 60 is provided within a separate housing 66, which may be plastic housings for example. The combination of the I/O circuit 60 within the housing 66 is referred to herein as an I/O module 68. The I/O modules 68 are releasably mounted on a printed circuit board 70, which is referred to herein as an I/O board. Each of the I/O modules 68 has two rows of connector pins 72 as shown in FIG. 5.

Each module 68 may be inserted into a respective connector or socket 74 in the I/O board 70. Each socket 74 has two rows of holes or apertures represented by the lines 76, 78 provided to match the pattern of connector pins protruding from each of the I/O modules 68. Each module 68 is secured to the I/O board 70 by a screw 82 in the module 68 and a respective threaded bore 84 in the I/O board 70. The I/O board 70 also has a connector 86 for electrically connecting each of the I/O modules 68 to the bus 62 (FIG. 3), or to the I/O devices 34, as the case may be. The specific manner of connecting the I/O modules 68 to the I/O board 70 is not considered important, and different manners of connection could be used.

While only four I/O modules 68 are illustrated on the I/O board 70 in FIG. 4, more modules 68 could be provided in the empty sockets 74, which are provided in groups of four. The I/O board 70 thus may have a capacity of at least 16 I/O modules.

It should be appreciated that each of the sockets 74 is identical, and that the connector pins 72 protrude from the different I/O modules 68 in identical fashion, regardless of the type of I/O module. Thus, any of the four types of I/O modules 68 can be inserted into any of the sockets 74 in the I/O board 70. As a result, the I/O board 70 can carry any combination of I/O modules 68. For example, if the I/O board 70 had 16 sockets on it, the I/O board 70 could carry 16 analog input modules, or 9 analog input modules and 7 analog output modules, or 13 digital input modules and 3 digital output modules, etc.

While FIG. 3 illustrates only four I/O circuits 60, it should be appreciated that more I/O circuits 60 would typically be used, and that all such I/O circuits would be connected to the microprocessor 40 via the buffer 50. The buffer 50 could be implemented with a plurality of bidirectional buffers, or a plurality of unidirectional buffers. It should also be understood that the controller 22 could contain multiple I/O boards 70 so as to provide more I/O modules 68. Alternatively, the I/O modules could be mounted on the same printed circuit board as the microprocessor 40.

The microprocessor 40 periodically reads from or writes to each of the I/O modules 68 at a predetermined rate, such as 20 times per second for example. The manner in which this is performed is described below in connection with FIGS. 6–9, which are circuit diagrams of the four I/O circuits 60a–60d, and FIG. 17, which is a flowchart of a portion of a computer program stored in the ROM 42 that controls the communication with the I/O modules 60.

DIGITAL INPUT CIRCUIT

Now referring to FIG. 6, a circuit diagram of the digital input circuit 60c is shown. The digital input (DI) circuit includes a pair of conductors or lines 102, 104 which are electrically connected to one of the I/O devices 34. Although the lines 102, 104 are shown terminating at the bottom portion of the I/O module housing 66, suitable connectors and cabling (not shown) connect the lines 102, 104 to the I/O device 34. The I/O device 34 generates either an open circuit or a short circuit across the lines 102, 104, depending upon the state of the condition being monitored. If the I/O device 34 generates a short circuit across the lines 102, 104, a current path is created from a supply voltage V through a diode 106, a resistor 108, a light-emitting diode 110, and through the lines 102, 104 to ground. A zener diode 112 is provided between the lines 102, 104 for surge protection.

Due to the current flow, the light-emitting diode 110 turns on a transistor 118 which pulls down the voltage at the input A4 of a buffer circuit 120. In the absence of current through the transistor 118, the voltage at the buffer input A4 is normally high due to its connection to a supply voltage V through a resistor 124.

If the I/O device 34 does not generate a short circuit across the lines 102, 104, the light-emitting diode 110 is not illuminated, and the transistor 118 does not turn on so that the voltage at the buffer input A4 remains high.

When the buffer 120 is enabled via an enable signal sent to the buffer 120 by the microprocessor 40 via a line 126, the voltage value at the buffer input A4 is transmitted to its Y4 output, and to the microprocessor 40 via a line 128.

The buffer 120 also provides a second function of indicating to the microprocessor 40 that the I/O circuit 60c is a digital input circuit. This is accomplished by buffer inputs A0 through A3 being tied to ground. When read by the microprocessor 40, the Y0 through Y3 outputs associated with the A0 through A3 inputs supply the binary code 0000 to the microprocessor 40 via four lines 130. This particular code signifies to the microprocessor 40 that it is communicating with a digital input circuit.

ANALOG INPUT CIRCUIT

A circuit diagram of the analog input circuit 60a is illustrated in FIG. 7. The analog input circuit 60a has a pair of lines 162, 164 connected to an I/O device 34 that complete a conventional 4–20 milliampere (ma) current loop between the analog input circuit 60a and the I/O device 34. A current regulator 166 connected to a supply voltage V supplies 25 ma of current to the I/O device 34 via the line 162. A current that varies between 4–20 ma is supplied from the I/O device 34 via the line 164. This variable current is supplied across a resistor 170 to generate a variable voltage that is supplied to an amplifier 172. A pair of zener diodes 174, 175 provide surge protection.

The voltage generated by the amplifier 172 is supplied to channel 0 of an A/D converter 180 via a line 176. The amplifier 172, which may be a conventional operational amplifier circuit, performs a scaling function that ensures that the range of voltages generated across the resistor 170 is about the same as the conversion range of an A/D converter 180 to provide maximum resolution.

Channel 1 of the A/D converter 180 is connected to a line 182 which supplies a constant reference voltage. As described in more detail below, the reference voltage is periodically converted by the A/D converter 180 and read by the microprocessor 40 to ensure that the A/D converter 180 is functioning properly.

The analog input circuit 60a also includes a buffer 190 having inputs A0 through A2 connected to ground and input A3 connected to a relatively high voltage via a resistor 192. When the enable input of the buffer 190 is activated by the microprocessor 40 via a line 194, the buffer 190 transmits the binary code 0001 to the microprocessor 40 via four lines 196. Based upon this binary code, the microprocessor 40 can identify the I/O circuit 60a as an analog input circuit.

A plurality of lines 198 carry clocking and data signals between the microprocessor 40 and the A/D converter 180, which may be an LTC1290DCJ integrated circuit chip commercially available from Linear Technologies. The line 198 connected to the DI input of the A/D converter 180 is used to select the parameters of the converter 180, such as which channel is to be read, for example. The line 198 connected to the DO output of the converter 180 transmits in serial fashion the multibit binary signal generated by the A/D converter 180 from the original analog input from the lines 162, 164.

The binary signal, corresponding to the analog input value, transmitted from the A/D converter 180 is temperature compensated by the microprocessor 40 based upon the temperature sensed by the temperature transducer 64. This is performed since the gain of the analog input circuit 60a varies with temperature.

DIGITAL OUTPUT CIRCUIT

Figure 8:
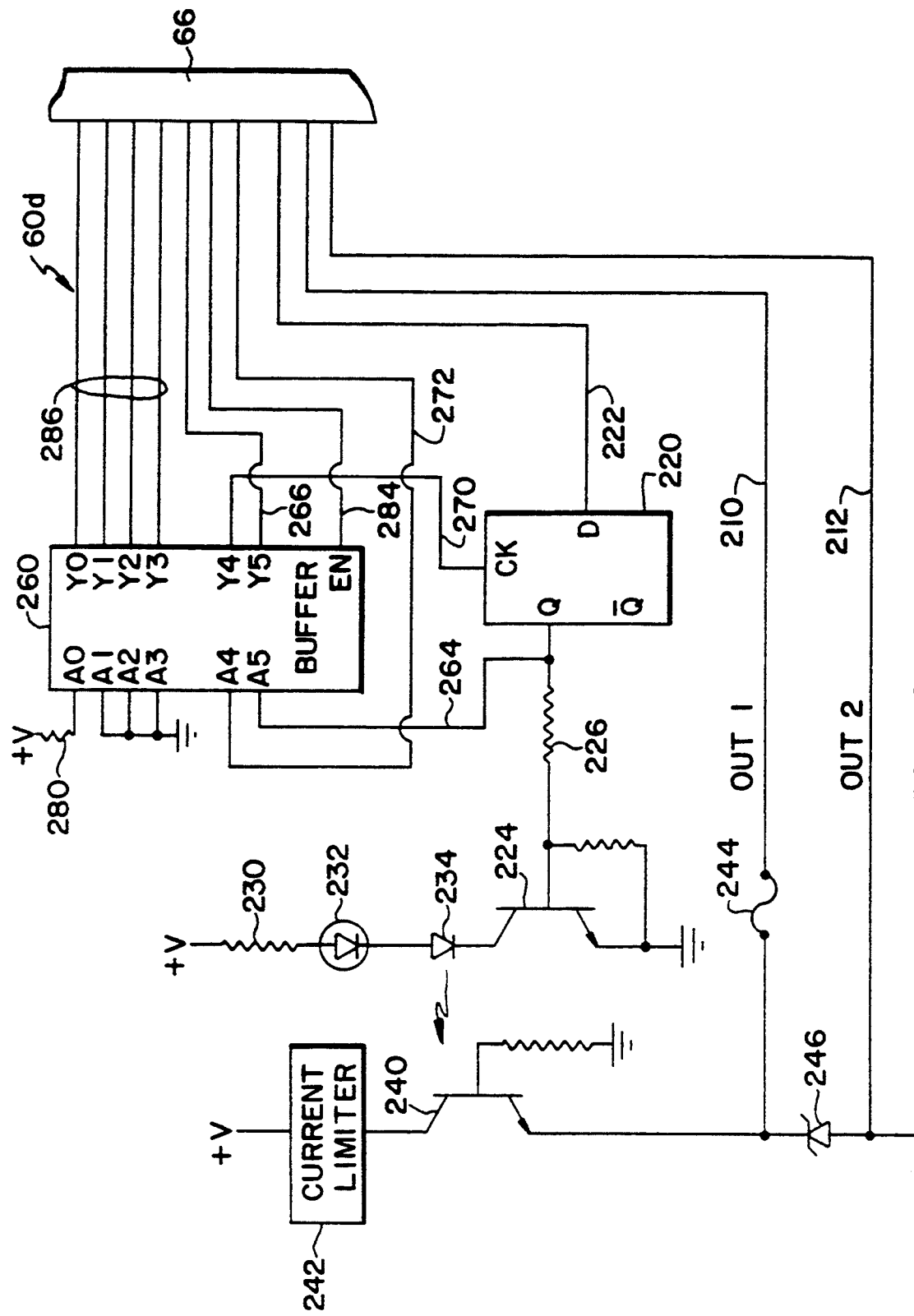
FIG. 8 is a circuit diagram of a digital output circuit shown schematically in FIG. 3.

A circuit diagram of the digital output circuit 60d is shown in FIG. 8. The digital output circuit includes a pair of lines 210, 212 connected to an I/O device 34 that is to be controlled by the digital output value. To control the value of the digital output, the microprocessor 40 transmits the appropriate binary signal to the input of a D flip-flop 220 via a line 222. The noncomplemented Q output of the flip-flop 220 is transmitted to the base of a transistor 224 via a resistor 226. When the Q output is high, the transistor 224 turns on, thus drawing current from a supply voltage V through a resistor 230 and a pair of diodes 232, 234. Upon current flow through the light-emitting diode 234, the light generated causes a transistor 240 to be turned on. As a result, current is drawn from a supply voltage V through a current limiter 242, through a fuse 244 into the output line 210, and back from the I/O device 34 via the input line 212 to ground. A zener diode 246 is provided for surge protection.

When the microprocessor 40 provides a low voltage signal to the input of the flip-flop 220, the transistors 224 and 240 do not conduct, thus preventing any current from being supplied to the line 210.

The Q output of the flip-flop 220 is also provided to the A5 input of a buffer 260 via a line 264 for the purpose of allowing the microprocessor 40 to check to make sure that the flip-flop 220 is providing the output that the microprocessor 40 specified via the line 222. To this end, upon supplying the signal on the line 222, the microprocessor 40 reads the Y5 output of the buffer 260 via a line 266 to make sure that it is the same binary value as the signal that was transmitted via the line 222.

The flip-flop 220 is clocked in a conventional manner by the Y4 output of the buffer 260 via a line 270. The Y4 output of the buffer 260 is controlled by its A4 input as supplied by the microprocessor 40 via a line 272.

The buffer 260 also has an input A0 tied to a relatively high voltage through a resistor 280 and three inputs A1 through A3 which are tied to ground. When enabled via a line 284, the buffer 260 transmits to the microprocessor 40 via the four lines 286 the binary code 1000 on its Y0 through Y3 outputs. The binary code 1000 signals the microprocessor 40 that the circuit 60d is a digital output circuit.

ANALOG OUTPUT CIRCUIT

Figure 9:
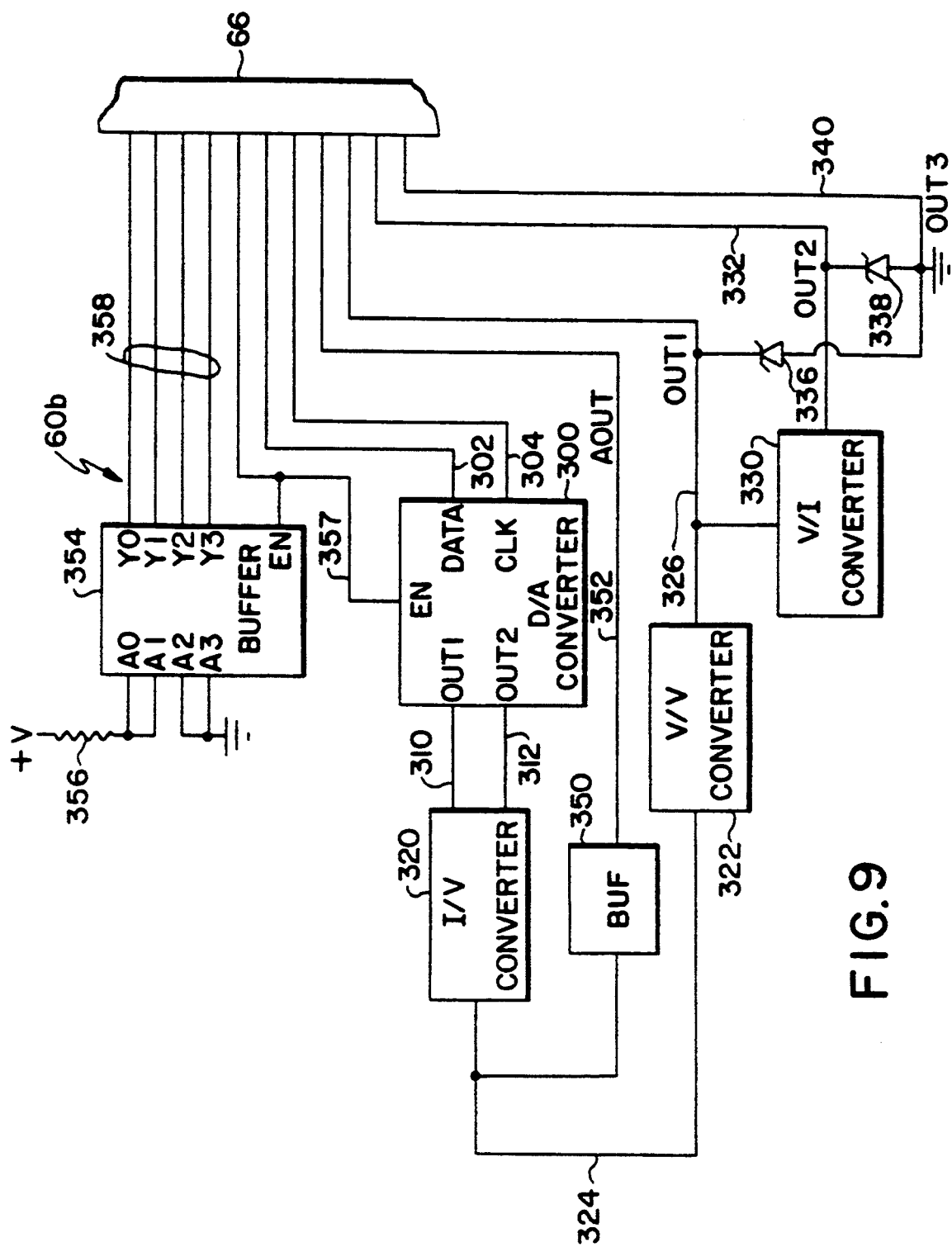
FIG. 9 is a circuit diagram of an analog output circuit shown schematically in FIG. 3.

A circuit diagram of the analog output circuit 60b is shown in FIG. 9. The analog output circuit 60b, which generates and transmits an analog signal to an I/O device 34, includes a digital-to-analog (D/A) converter 300 having a DATA input coupled to a line 302 and a CLK input coupled to a line 304. The microprocessor 40 specifies the value of the analog signal to be output to the I/O device 34 by transmitting a multi-bit binary signal in serial fashion to the DATA input via the line 302. Upon receiving this binary signal, the D/A converter 300 generates a current having a corresponding value in a pair of lines 310, 312 connected to its OUT1 and OUT2 outputs.

The current is provided to a current-to-voltage (I/V) converter 320 via the lines 310, 312. The I/V converter 320 generates a voltage proportional to the input current and transmits the voltage to a voltage-to-voltage (V/V) converter 322 via a line 324. The V/V converter 322 generates a voltage on a first output line 326. The line 326 is also connected to a voltage-to-current (V/I) converter 330, which converts the voltage at its input to a current and transmits the current to a second output line 332. A pair of zener diodes 336, 338 are connected between the two output lines 326, 332 and a third output line 340 to provide surge protection.

The three output lines 326, 332, 340 are included to provide flexibility in the types of I/O devices 34 that the analog output circuit 60b can control. In particular, I/O devices 34 that are voltage-driven are connected between the output lines 326 and 340, whereas I/O devices 34 that are current-driven are connected between the output lines 332 and 340.

The output of the I/V converter 320 on the line 324 is also provided to a buffer 350. The purpose of buffering the output of the I/V converter 320 is to allow the microprocessor 40 to check the accuracy of the voltage generated by the I/V converter 320 to make sure that it corresponds to the magnitude of the multi-bit binary signal that the microprocessor 40 transmitted to the analog output circuit via the line 302. The output of the buffer 350 is provided on a line 352 as an AOUT signal. As described below, this AOUT signal is transmitted to an A/D converter in the temperature transducer circuit 64 where its value is periodically read by the microprocessor 40.

The analog output circuit 60b also includes a buffer 354. The buffer 354 has two inputs A0, A1 tied to a relatively high voltage through a resistor 356 and two inputs A2, A3 which are tied to ground. When enabled via a line 357, the buffer 354 transmits to the microprocessor 40 the binary code 1100 on its Y0 through Y3 outputs via four lines 358. The binary code 1100 signals the microprocessor 40 that the circuit 60b is an analog output circuit.

TEMPERATURE TRANSDUCER CIRCUIT

Figure 10:
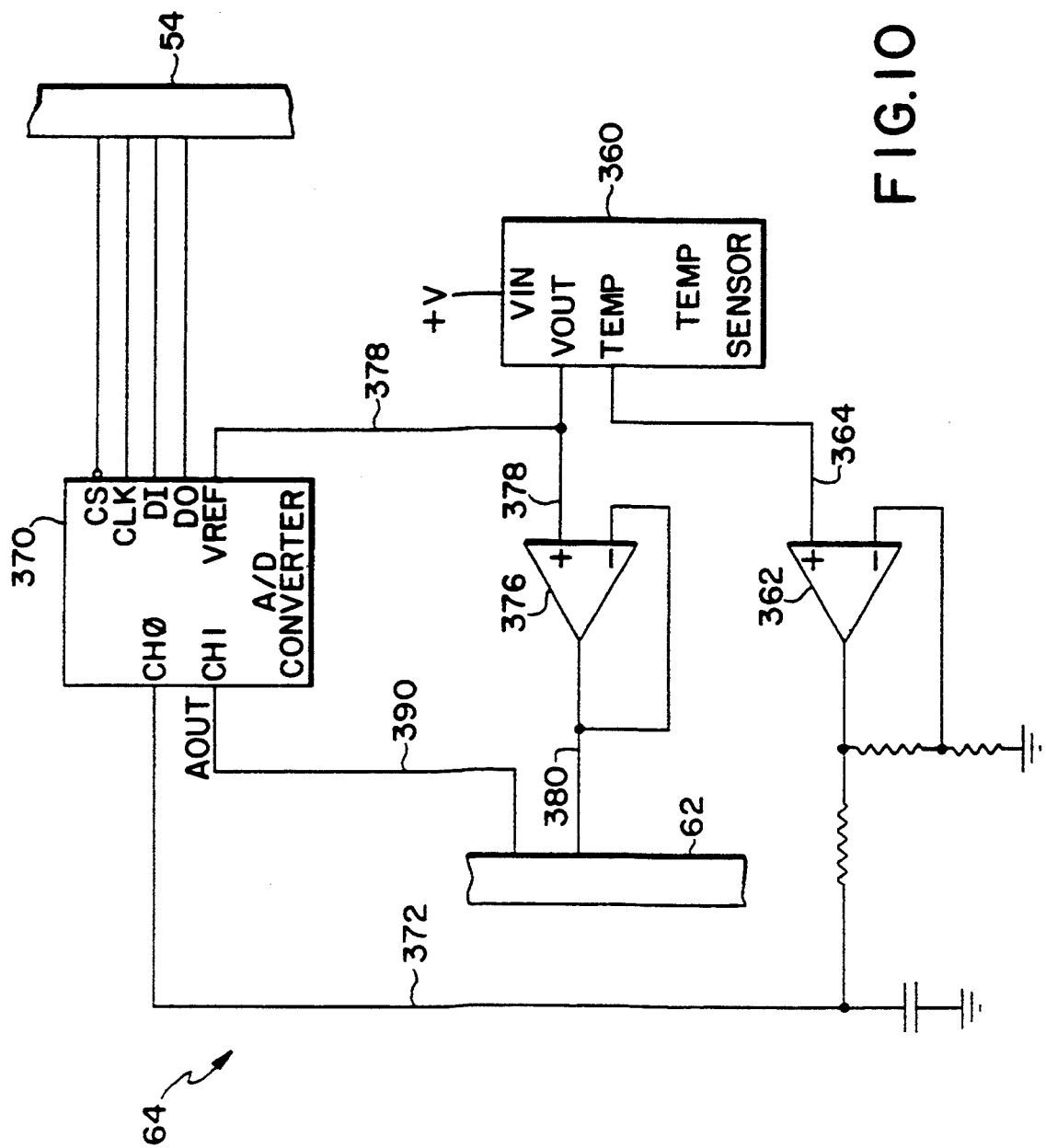
FIG. 10 is a circuit diagram of a temperature transducer circuit shown schematically in FIG. 3.

FIG. 10 is a circuit diagram of the temperature transducer 64 schematically shown in FIG. 3. The transducer circuit 64 includes a temperature sensor circuit 360 that generates an analog signal on its TEMP output that is proportional to the sensed temperature. Since the sensor circuit 360 is physically located within the housing of the controller 22, the sensed temperature is that temperature within the controller housing, which should be substantially the same temperature as the analog input circuit modules 60 since they are also located within the same controller housing. The sensor circuit 360 may be a commercially available LT1019 integrated circuit chip.

The analog temperature signal generated by the temperature sensor 360 is provided to the noninverting input of an operational amplifier 362 via a line 364. The purpose of the operational amplifier 362 is to amplify the temperature signal since it has a relatively small voltage (2.1 millivolts/° Kelvin).

The output of the operational amplifier 362 is connected to channel 0 of an A/D converter 370 via a line 372. The A/D converter 370 converts the analog signal to multi-bit binary form for serial transmission from its DO output to the microprocessor 40 via the bus 54. Channel 1 of the A/D converter 370 is connected to a line 390, which is connected to receive the AOUT signal from the line 352 (FIG. 9) via the bus 62. As described in more detail below, the A/D converter 370 periodically converts the AOUT signal on the line 390 to verify the correct operation of the analog output circuit of FIG. 9.

The temperature sensor 360 generates a temperature-compensated reference voltage on its VOUT output. Because it is temperature compensated, this reference voltage is constant regardless of changes in temperature. The compensated reference voltage is supplied to the A/D converter 370. Supplying the compensated reference voltage to the A/D converter 370 is advantageous since it reduces any temperature-induced fluctuations within the converter 370, thus allowing for more accurate conversions.

The compensated reference voltage is also supplied to the noninverting input of an operational amplifier 376 via a line 378. The amplifier 376 acts as a buffer, and its output on the line 380 is electrically connected to the line 182 shown in FIG. 7 via the bus 62 (FIG. 3) for the purpose of supplying the reference voltage for the A/D converter 180.

OPERATING SYSTEM

The operation of the process controller 22 is controlled by a computer program stored in the ROM 42 (FIG. 3) and executed by the microprocessor 40. The computer program includes an operating system 400 that controls the execution of a number of subordinate computer program routines which perform various functions, or tasks.

Figure 11:
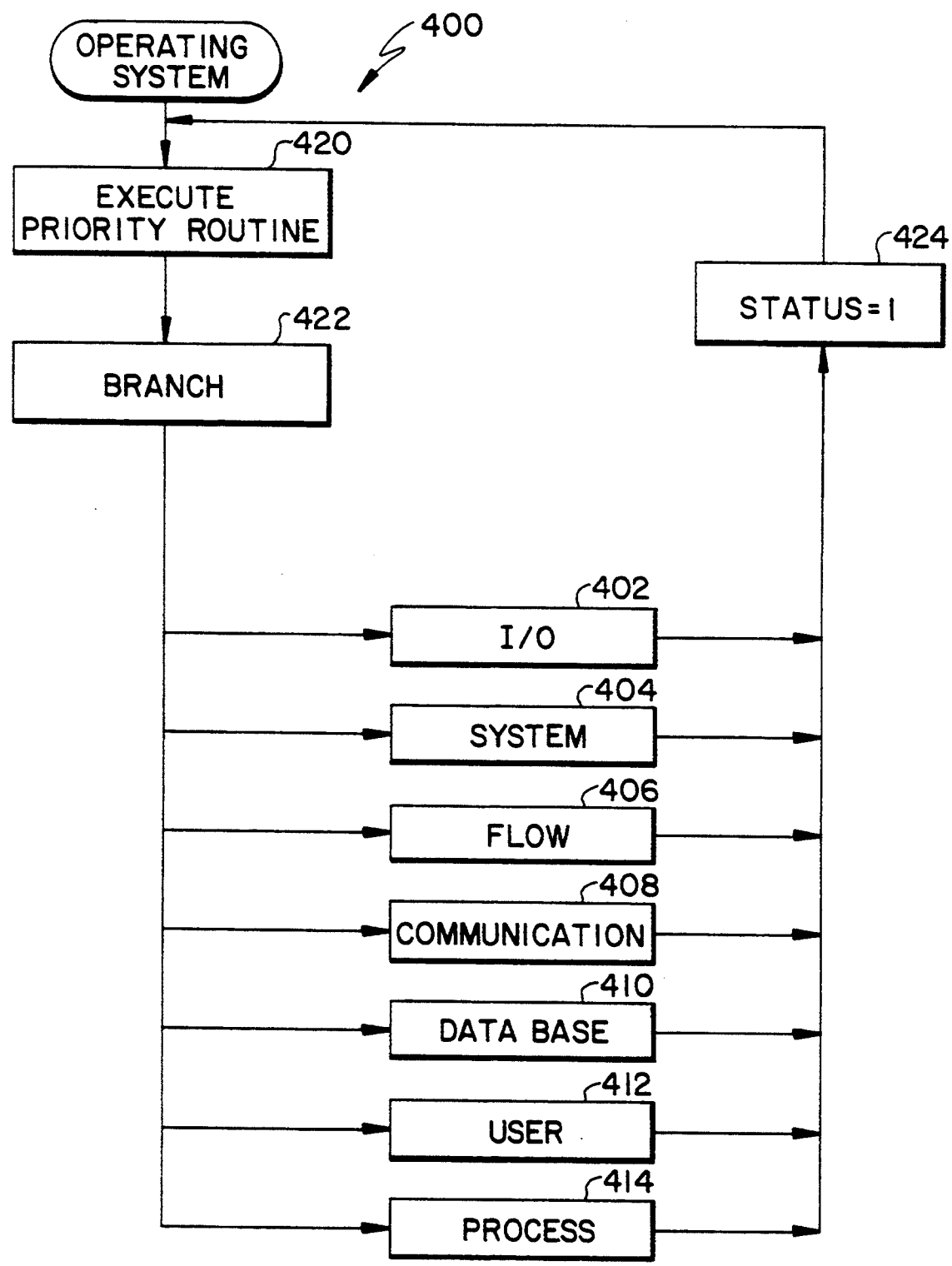
FIG. 11 is a flowchart of an operating system in accordance with a preferred embodiment of the invention.

Referring to FIG. 11, a flowchart of the operating system 400 illustrates the general operation of the operating system. The tasks performed include an I/O task that is performed at step 402, a system task performed at step 404, a flow task performed at step 406, a communication task performed at step 408, a database task performed at step 410, a user task performed at step 412, and a process task performed at step 414.

The I/O task, which is described in detail below, accomplishes communication between the I/O circuits 60 and the microprocessor 40 within the process controller 22. The system task performs various system functions. The flow task performs calculations to determined the magnitude of a flow, such as a liquid or gas flow, based upon analog input readings from the I/O devices 34.

The communication task accomplishes communication between the process controller 22 and the host computer 20. This task may also include other types of communications. The database task is performed to update a historical database stored in the process controller 22. The user task is performed to execute any computer programs provided by the user of the process controller 22. The process task is performed to make calculations relating to the processes under control.

The above tasks are generally performed in conventional process controllers, and thus the detailed operation of the tasks is not considered pertinent to the present invention. However, the order in which the tasks are executed and the assignment of various priorities to each of the tasks, as determined by the operating system, is an important feature of the invention.

The performance of each of the tasks described above is accomplished with the use of "time slots," which are successive periods of time of predetermined duration. Each of the tasks is allocated to at least one time slot, which is then reserved for the performance of that task.

This allocation is illustrated in FIG. 12a. In general, the tasks are executed in the order in which they appear in the successive time slots. Thus, the I/O task is performed during time slot 1, then the system task is performed during time slot 2, etc. After the completion of the process control task at time slot 10, the I/O task at time slot 1 is again performed, and the tasks are repeatedly performed in that order.

It should be noted that three of the tasks, the I/O, system, and flow tasks, are allocated to more than one time slot. As a result, those tasks are performed more frequently than the tasks which are allocated to only a single time slot.

The operating system is designed so that each of the tasks is usually completely performed during its associated time slot. However, if a task is not completed within its time slot, the execution of that task is temporarily interrupted and the task is completed during a subsequent time slot. The operation in such cases is described with reference to FIGS. 12b–12d.

FIG. 12b illustrates one example of the operation. In FIG. 12b, assume that the communication task was not finished at the end of time slot 3. During time slot 4, assume that the database task required substantially the entire time slot to completely execute, but that the user task only required a portion of time slot 5 to completely execute. In this case, the remaining portion of the communication task would be completed during time slot 5, after the completion of the user task.

A second example is illustrated in FIG. 12c. Assume that neither the communication task nor the database task could be completed during their respective time slots 3 and 4. Also assume that the complete execution of the user task required only a small portion of time slot 5. In this case, the remainder of the communication task would be completed during time slot 5, and then the remainder of the database task would be completed, also during time slot 5.

It should be noted that, in FIG. 12c, while both the communication and database tasks remained uncompleted at the beginning of time slot 5, the communication task was completed first, before the database task. As described in more detail below, this is because any unfinished tasks are completed in accordance with the number of the time slot to which they are allocated, with numerically lower time slots having priority.

This determination of priority among unfinished tasks is made by the priority routine executed at step 420 shown in FIG. 11. As described in more detail below, the priority routine also makes additional priority determinations with respect to the execution of the tasks. This includes the capability of an uncompleted task to preempt a task from being executed during its own time slot. This example is illustrated in FIG. 12d.

As shown in FIG. 12d, if the I/O task is not completed during time slot 1, it is finished during time slot 2 before the start of the system task that is allocated to time slot 2. This operation is followed because the I/O task is considered to be of sufficiently high priority so as to preempt the execution of the system task. If the system task is not completed at the end of time slot 2, it is completed during time slot 3 after the completion of the communication task.

Referring back to FIG. 11, after the priority routine determines which of the tasks is to be performed at one of the steps 402–414, the program branches to that task via branch step 422. After the completion of the task, the program branches to step 424, where, as explained in more detail below, a STATUS variable is set to one to indicate that the task was completed.

Figure 13:
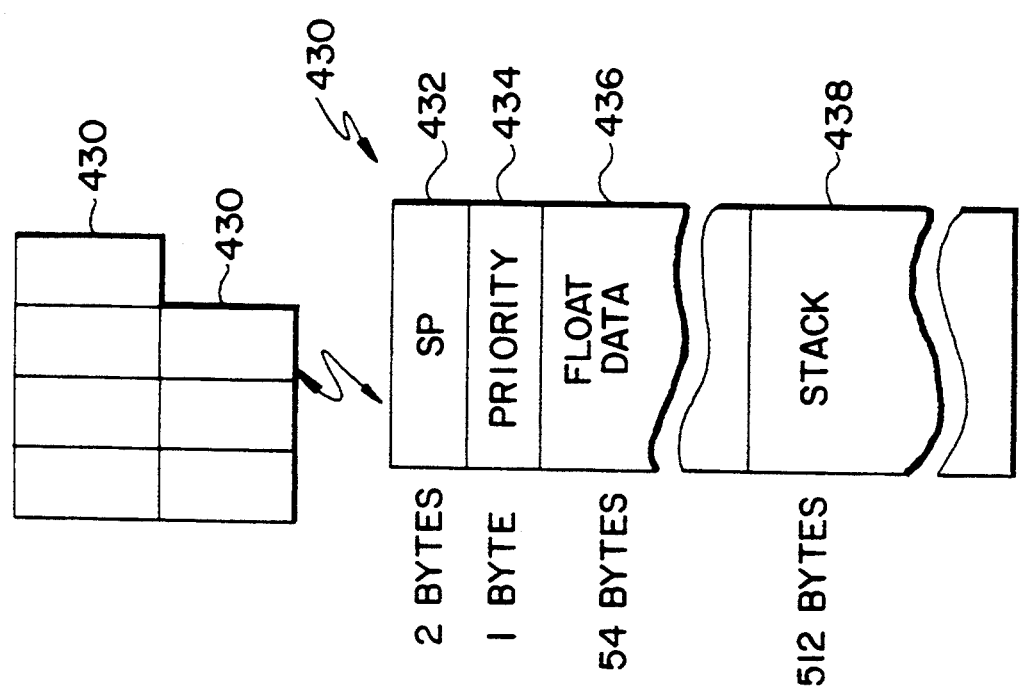
FIG. 13 illustrates the memory organization of a portion of a RAM shown in FIG. 3.

FIG. 13 illustrates the logical organization of a portion of the RAM 44 shown in FIG. 3. The RAM 44 includes seven memory portions 430, each of which is associated exclusively with one of the seven tasks that is performed during one of the steps 402–414.

The logical structure of each of the seven memory portions 430 is illustrated in the lower half of FIG. 13. Each memory portion 430 includes a 2-byte stack pointer (SP) location 432, a 1-byte priority location 434, a 54-byte float data portion 436, and a 512-byte stack 438. The float data portion 436 stores various floating point data generated during the operation of a task associated with the memory portion 430, and the priority location 434 stores the current priority of the task associated with that memory portion. A priority value of 0 indicates that a task was completed during its time slot, whereas a priority value of 1 indicates that the task has not yet been completed.

The provision of a separate memory portion for each of the tasks is advantageous in that each of the tasks can be temporarily interrupted and resumed at a later time. This is accomplished by saving the current values of all the data in the internal registers (not shown) of the microprocessor 40 in the memory portion 430 associated with the task that was interrupted.

Also, the separate memory portions 430 allow more than one task to remain in a temporarily uncompleted state. For example, during time slot 5 of the operating example 2 shown in FIG. 12c, one of the memory portions 430 would preserve the interrupted status of the communications task, and another of the portions 430 would preserve the interrupted status of the database task. Since the interrupted status of these two tasks is preserved, they can be completed at the end of time slot 5 beginning from the point at which they were interrupted.

Figure 14:
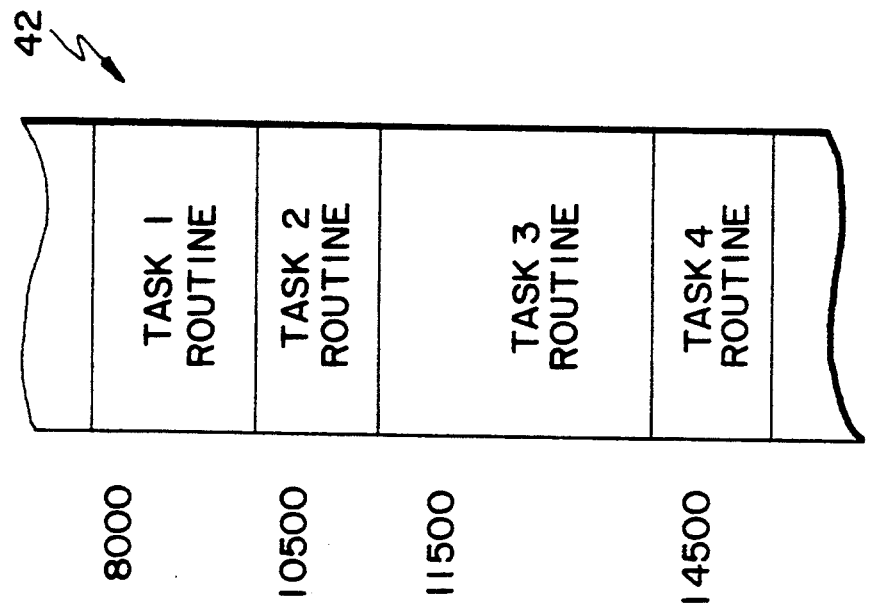
FIG. 14 illustrates the location of several computer program routines in the ROM shown in FIG. 3.

Referring to FIG. 14, a portion of the ROM 42 of FIG. 3 is shown to include the computer program routines necessary to execute tasks 1–4, along with the beginning addresses of those tasks 1–4.

The time slots described above are generated by a software counter (not shown) that causes an interrupt to be generated every 10 ms. When an interrupt is generated, an interrupt service routine 500 shown in FIG. 15 is performed.

The interrupts are generated at these fixed intervals without regard to the current operation of the program. Thus, referring to FIG. 11, the program may be executing either the priority routine at step 420 or one of the tasks at one of the steps 402–414.

INTERRUPT ROUTINE

Figure 15:
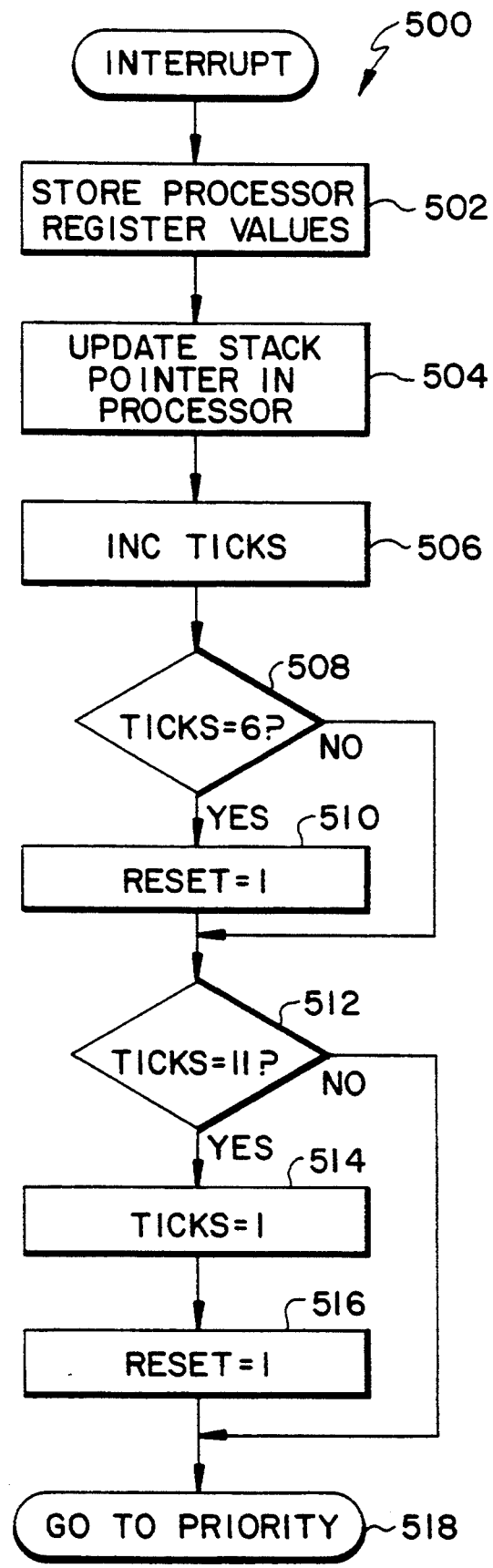
FIG. 15 is a flowchart of an interrupt service routine.

Referring to FIG. 15, when the interrupt routine 500 begins execution at step 502, the contents of the internal registers in the microprocessor 40 are stored in the memory portion 430 associated with the task that was being executed when the interrupt was generated. These processor register values include the address at which the ('' task routine was interrupted. For example, such address might be 12500 if task 3 was interrupted (see FIG. 14).

These register values are stored in the stack 438 of the associated memory portion 430, and at step 504, the value of the stack pointer in the microprocessor 40 is updated to reflect the fact that data was added to the stack 438.

At step 506, the variable TICKS is incremented by one. The value of the TICKS variable, which may vary from 1 to 10, specifies the current time slot. For example, if TICKS is 5, the current time slot is slot 5, during which the user task would be performed as shown in FIG. 12a.

At step 508, if the value of the TICKS variable is 6, the program branches to step 510 where a RESET flag is set to 1. At described below, the value of the RESET flag determines whether the priority values (which specify whether a task has been completed and the values of which are stored in the memory locations 434 of FIG. 13) are reset to 0.

At step 512, if the value of the TICKS variable is 11, the program branches to step 514 where the value of TICKS is reset to 1, and then to step 516 where the RESET flag is set to 1. The interrupt service routine ends at step 518, at which point it branches to the priority routine.

PRIORITY ROUTINE

A detailed flowchart of a priority routine 520 that is performed at step 420 is shown in FIGS. 16a–16d. The priority routine 520 performs various data transfer functions as well as making the priority determinations described generally above.

Figure 16A:
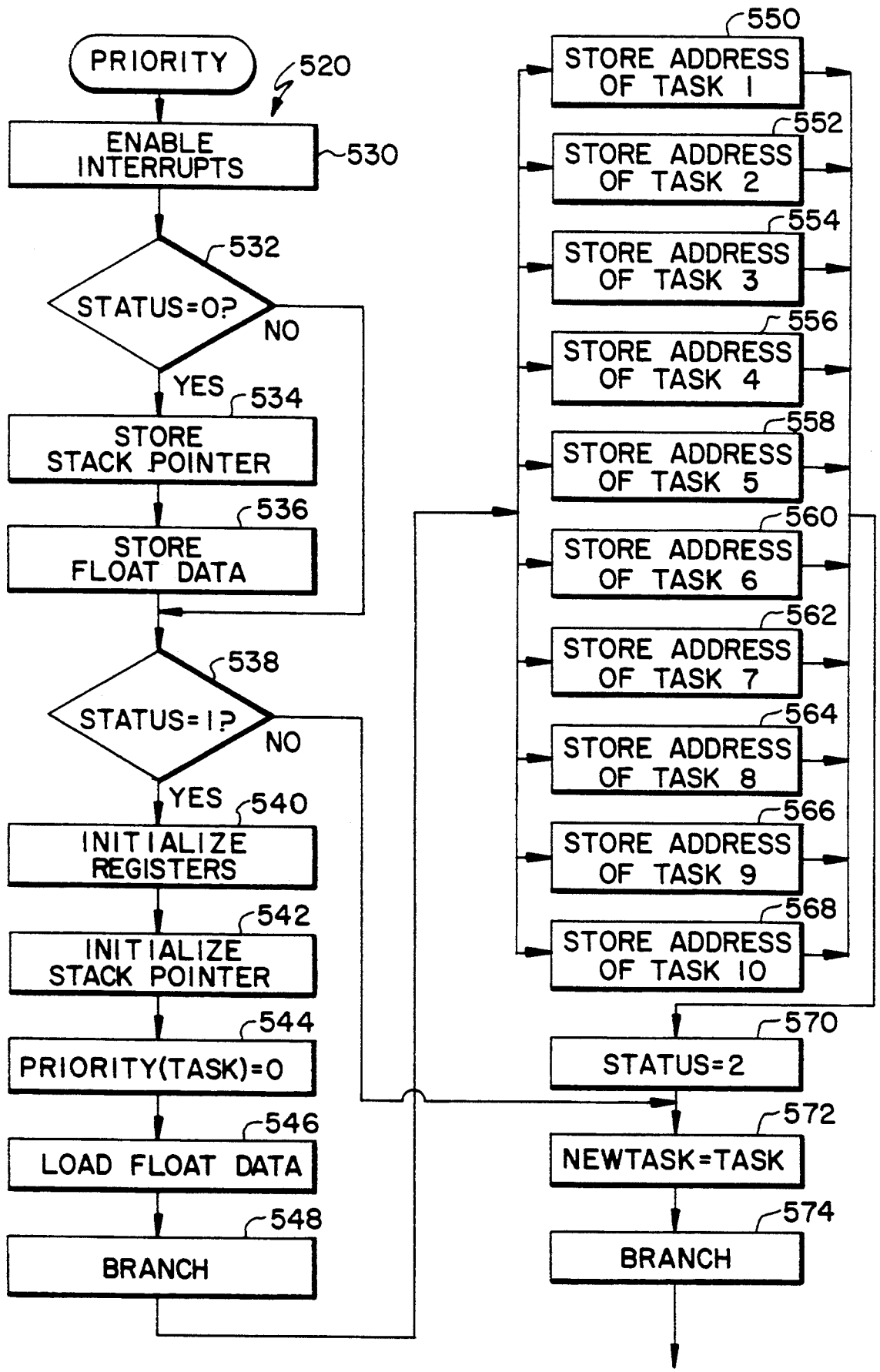
FIGS. 16a–16d are a flowchart of a priority routine schematically shown in FIG. 11.

Referring to FIG. 16a, at step 530 interrupts are enabled. As a result, the execution of the priority routine may be interrupted by one of the interrupts generated every 10 ms.

At step 532, the STATUS variable is checked to determine whether it is 0. The STATUS variable can have three values: 0, 1 or 2. If the STATUS variable is 0, the interrupt was generated during the performance of one of the tasks at one of the steps 402–414. If the STATUS variable is 1, the interrupt was generated: 1) after a task was completed during its time slot, and 2) when the priority routine was performing one of steps 530–570. If the STATUS variable is 2, the interrupt was generated: 1) after a task was completed, and 2) when the priority routine was performing one of steps following step 572.

At step 532, if the STATUS variable is 0, indicating that the interrupt was generated during the performance of one of the tasks, then steps 534, 536 are performed to save the current status of the task that was interrupted so that it can be resumed at a later time. In particular, at step 534, the value of the stack pointer that was saved in the processor register during step 504 of the interrupt routine 500 is stored in the SP location 432 of the memory portion 430 associated with the task that was interrupted. At step 536, the float data is transferred from a number of memory registers (not shown) in the RAM 44 to the float data portion 436 of the same memory portion 430. These memory registers are used by the microprocessor 40 during execution of all the tasks.

At step 538, if the STATUS variable is 1, steps 540–570 are performed. The purpose of these steps is primarily to prepare for the subsequent execution of the task that was just completed. For example, if the process task was just completed during time slot 8 (FIG. 12a), steps 540–570 update the contents of the memory portion 430 associated with the process control task so that it may be performed at the beginning of the next time slot 8, which would be 90 ms later.

At step 540, the contents to which the internal registers of the microprocessor 40 should be initialized are saved onto the stack 438 for the associated task, and the contents of the stack pointer 432 are initialized. At step 544, the contents of the priority location 434 for the task that was just completed is reset to 0.

At step 546, the floating point data is transferred from the memory registers to the float data portion 436 of the associated memory portion 430. At step 438, the program then branches to one of steps 550–568, based upon the task that was just completed. For example, if the task that was just completed was task 2, the program branches to step 552. At each of the steps 550–568, the starting address of the associated task routine, e.g. 10500 for task 2 (see FIG. 14), is stored on the bottom location of the stack 438 associated with that task. When that same task is begun 90 ms later, the microprocessor 40 automatically branches to the address specified by the bottom location of the stack.

At step 570, the STATUS variable is set to 2 to indicate that steps 540–568 were successfully completed without being interrupted. At step 572, the value of a TASK variable is set equal to a NEWTASK variable. The TASK variable specifies the number of the current task, while the NEWTASK variable specifies the number of the task that is to be performed next. At step 574, the program branches to one of 10 priority determining routines, based on the value of the TICKS variable, which defines the current time slot number as described above.

In the following description, a reference to a task number refers to the task allocated to that time slot number. For example, for the allocation of FIG. 12a, task 1 is the I/O task. It should be appreciated that, since a task may be allocated to more than one time slot, two different task numbers may refer to the same task. For example, both task 1 and task 5 would be the I/O task for the allocation of FIG. 12a.

Figure 16B:
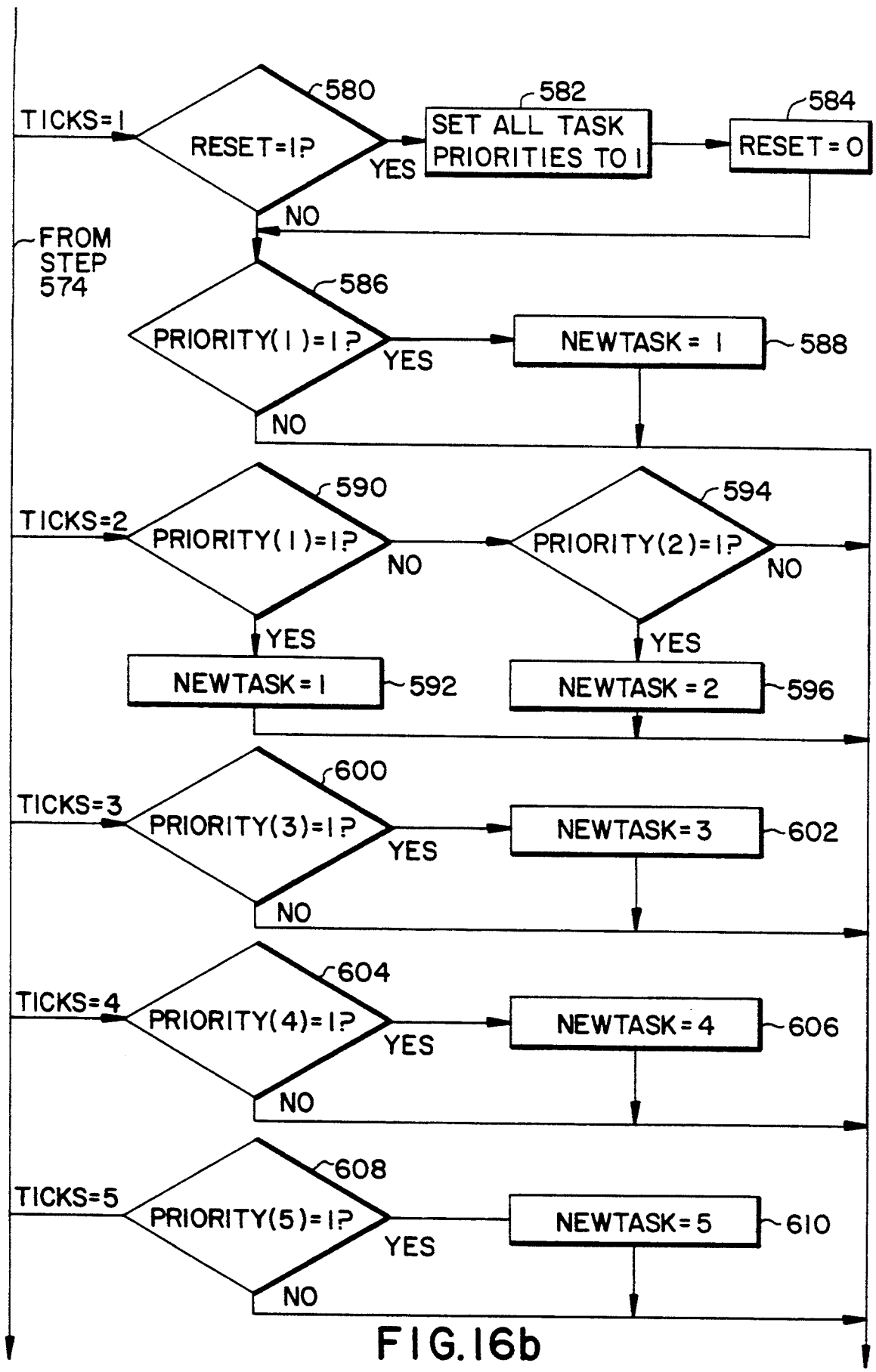

Referring to FIG. 16b, if the value of the TICKS variable is 1, meaning that it is time slot 1, the program branches to step 580, where the value of the RESET flag is tested to determine whether it is 1. The RESET flag in this case is used to determine whether the priority values of all the tasks as stored in the respective memory locations 434 should be reset to 1. As explained above, a priority of 1 indicates that a task needs to be performed, whereas a priority of 0 indicates that the task has already been performed. At time slot 1, the priority of each task needs to be set to 1 so that all the tasks are performed during that cycle through the time slots 1–10.

If RESET is 1 during time slot 1 as determined at step 580, then the program has not yet set the priorities of all the tasks to 1. In this case, the program branches to step 582 where all priorities are set to 1. The program then branches to step 584 where the value of RESET is set to 0.

If RESET was not 1 as determined at step 580, the program branches to step 586. This would be the case where steps 580–584 were performed after the interrupt, the task for time slot 1 was completed, and the program came back to step 580, still during time slot 1 (TICKS=1).

At step 586, the priority of task 1 is tested to determine if it is 1. If it is, which indicates that task 1 has not yet been performed during time slot 1, then the program branches to step 588 where the value of NEWTASK is set to 1 so that task 1 will be performed next. If the priority of task 1 is not 1, then the current value of NEWTASK is not changed.

If the current time slot is time slot 2 (TICKS=2), the program branches to step 590. Steps 590–596 implement the priority determination described in connection with FIG. 12d. In particular, if task 1 was not completed during time slot 1, it will preempt the performance of the task allocated to time slot 2. Thus, at step 590, if the priority of task 1 is 1, then the value of NEWTASK is set to 1 so that task 1 will be completed next. If the priority of task 1 is 0, indicating that it has been completed, the program branches to step 594, where the program determines whether task 2 has been completed during time slot 2 by checking its priority. If task 2 has not been completed, then the program branches to step 596 where NEWTASK is set to 2 so that task 2 will be performed next.

If the current time slot is time slot 3 (TICKS=3), the program branches to step 600, where the priority of task 3 is checked. If the priority of task 3 is 1, then the program branches to step 602, where the value of NEWTASK is set to 3 so that task 3 will be performed. Steps 604–610 perform the same functions as steps 600, 602, but for time slots 4 and 5.

Figure 16C:
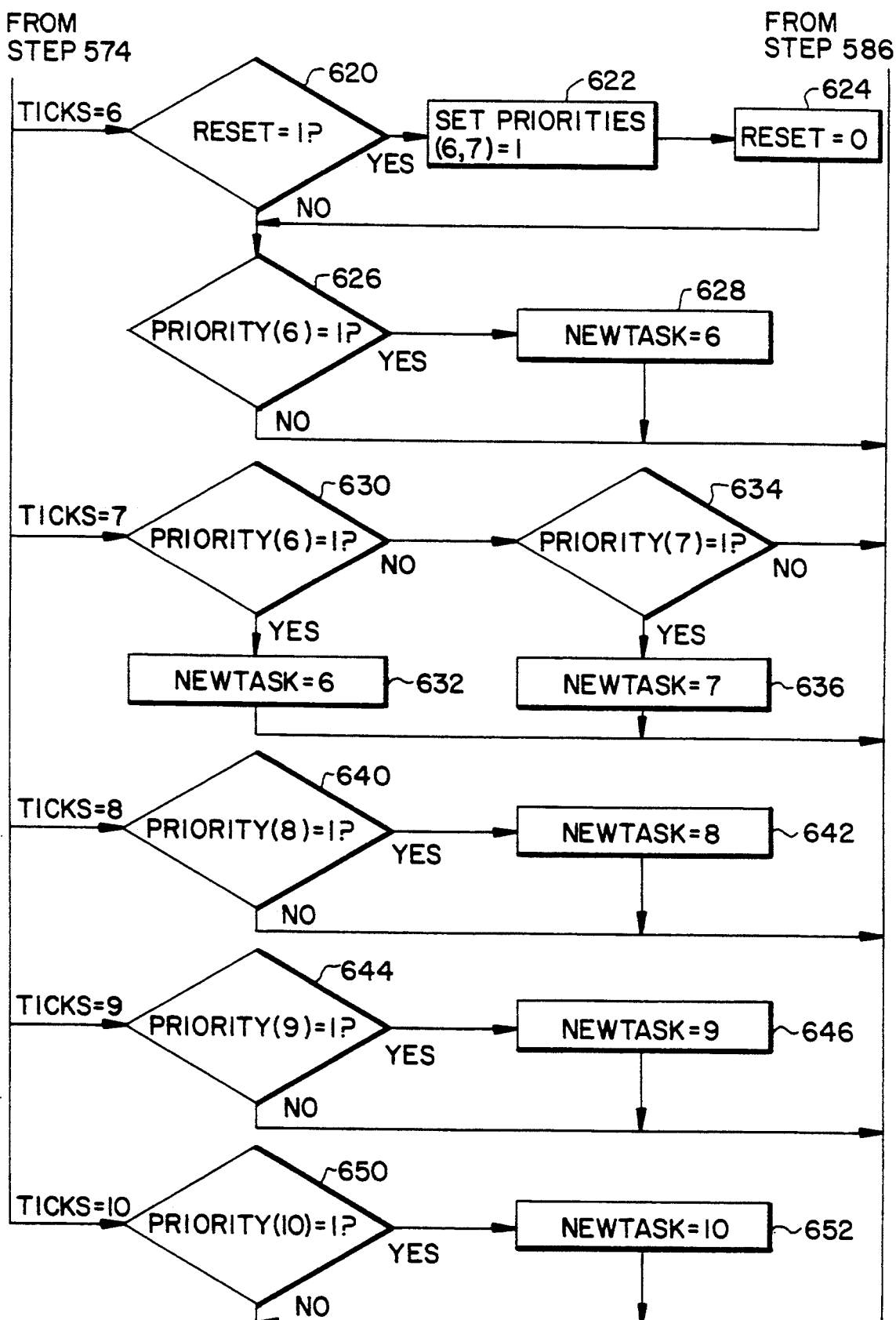

Referring now to FIG. 16c, if the current time slot is time slot 6 (TICKS=6), the program branches to step 620. Steps 620–624 are similar to steps 580–584. However, instead of selectively resetting all priorities to 1, they reset only the priorities of tasks 6 and 7 to 1. This is done because, as indicated in FIG. 12a, the I/O and system tasks are allocated both to time slots 1, 2 and to time slots 6, 7. Since the tasks 1, 2 would have been performed during time slots 1, 2, their priorities would have been set to 0. As a result, they would not be performed again at time slots 6, 7 unless their priorities were reset to 1.

Accordingly, at step 620 the value of RESET is tested to determine whether it is 1 (note that step 510 of the interrupt routine sets this value to 1 at the start of time slot 6), the program branches to step 622, where the priorities of tasks 6, 7 are set to 1. Then the program branches to step 624 where the value of RESET is set to 0.

At step 626, if the priority of task 6 is 1, the program branches to step 628 where NEWTASK is set to 6 so that task 6 will be performed next.

Steps 630–636 for time slot 7 perform the same functions as steps 590–596 for time slot 2. Also, steps 640–652 perform the same functions as steps 600–610.

Figure 16D:
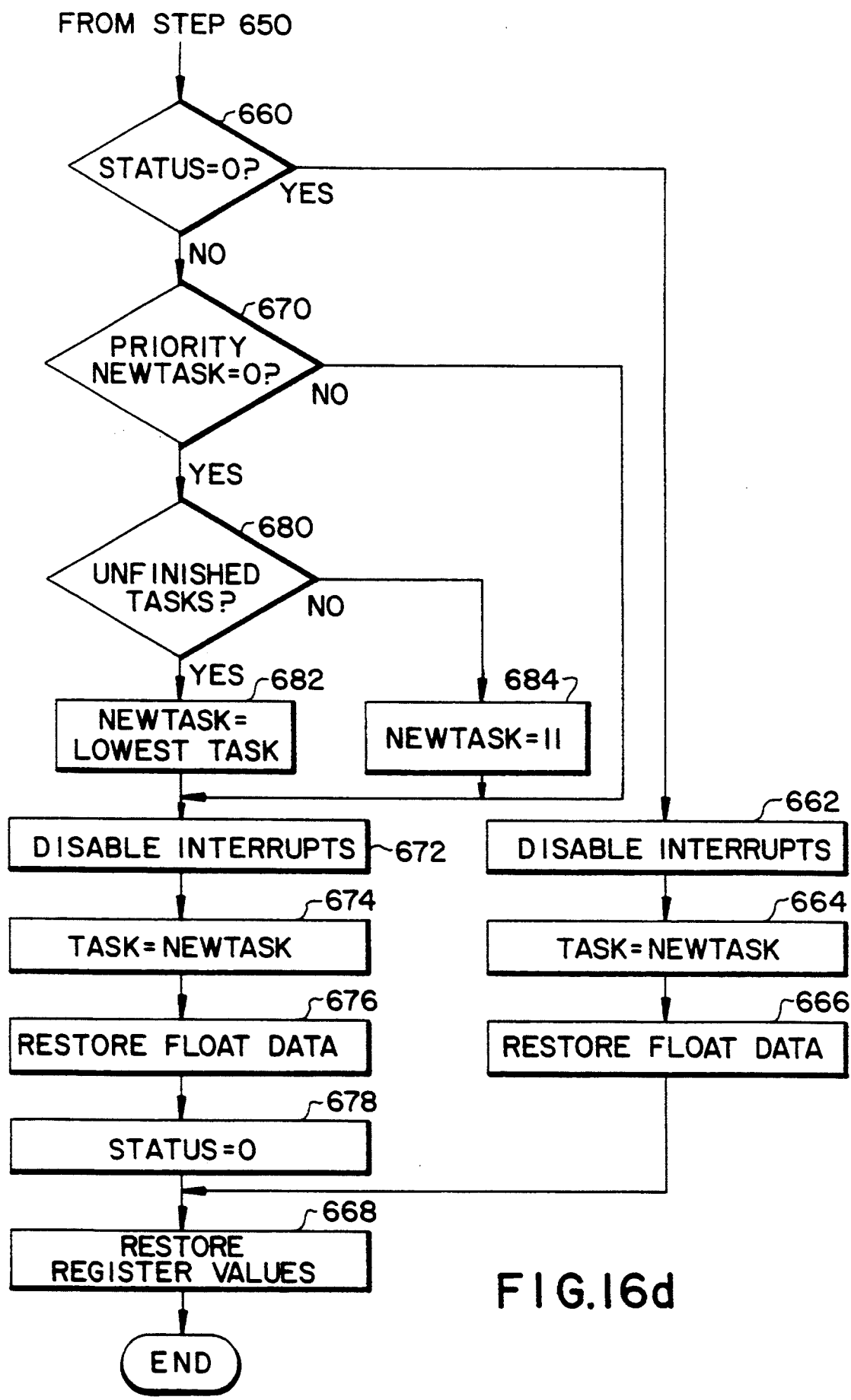

It might be noted that, even though the flow task is allocated to both time slots 9, 10 as indicated in FIG. 12a, the priority of task 9 was not reset at the beginning of time slot 10 (similar to steps 620, 624 for example). Resetting the priority of the flow task is not necessary in this particular case because the flow task is a more complicated routine, and its execution is not completed at the end of time slot 9. Hence, its priority does not need to be reset at the beginning of time slot 10. Referring to FIG. 16d, the final portion of the priority routine is illustrated. At step 660, the STATUS variable is checked to determine whether it is 0. If it is, meaning that a task was being performed when the interrupt was generated, then the program branches to step 662, where interrupts are disabled. At step 664, the value of NEWTASK is stored in the TASK variable so that the new task that was determined by the above portion of the priority routine will be performed. At step 666, the floating point data is retrieved from the float data portion 436 for the new task that is to be performed, as specified by the TASK variable, and that float data is stored in the memory registers referred to above.

At step 668, the values of the registers that were previously stored in the stack 438 of the task that is to be performed are retrieved and stored in the registers in the microprocessor 40. This results in the address of the task routine being stored in the program counter register of the microprocessor 40 so that, immediately after step 668, the selected task begins execution.

If STATUS was not 0 as determined at step 660, meaning that a task was completed during the current time slot, the priority of the task number stored in the NEWTASK variable is tested to determine whether it is 0. If the priority is not 0, then the new task needs to be performed, so the program branches to step 672. Steps 672–676 perform the same functions as steps 662–666. At step 678, the value of the STATUS variable is reset to 0 since a task is about to be performed. As a result, if the operation of that task is interrupted, the value of STATUS will remain 0, whereas STATUS will be set to 1 (at step 424 of FIG. 11) if the task is completed.

If the priority of the new task is 0 as determined at step 670, the program branches to step 680 where it determines, by checking the priorities of all the tasks, whether there are any unfinished tasks. If there are any unfinished tasks, then the task allocated to the numerically lowest time slot is performed by storing the lowest task number in NEWTASK at step 682. This determination of priority of unfinished tasks is described above in connection with time slot 5 of FIG. 12c.

If there are no unfinished tasks, the program branches to step 684, where the value of NEWTASK is set to 11. "Task 11" is actually a waiting routine that is an infinite loop. The program simply stays in that loop until the next interrupt is generated.

Many changes could be made to the operating system and/or the priority routine described above. The tasks described above could be allocated to the time slots in different ways, and additional or different tasks could be used. The priority routine could be implemented to utilize one or more of the ways in which priority between tasks is determined.

I/O TASK ROUTINE

The manner in which the microprocessor 40 of the controller 22 communicates with the I/O circuits 60 is explained in connection with FIG. 17, which is a detailed flowchart of an I/O routine 700 that may be performed during step 402 in FIG. 11.

Upon power up of the process controller 22, before the periodic execution of the I/O routine 700, the microprocessor 40 interrogates each of the I/O modules 68 to which it is connected to determine which type of I/O module is in each of the sockets 74 on the I/O board(s) 70. This interrogation entails transmitting a code-request signal, which in this particular case is a buffer enable signal, and reading the four-bit binary code transmitted by the buffer in each I/O circuit. Based upon each particular code, the microprocessor 40 determines the type of each of the I/O modules 68 and "remembers" what type each I/O device is by storing each code or a similar type code in memory. Thus, the microprocessor 40 need only interrogate the I/O modules 68 once upon power up.

After the initial interrogation, the microprocessor 40 periodically executes the I/O routine 700 to read from or write to each of the I/O modules 68. The I/O routine 700 could be performed 20 times per second, for example. Each time the I/O routine 700 is performed, the microprocessor 40 communicates with each of the I/O modules 68 to which it is connected.

Figure 17:
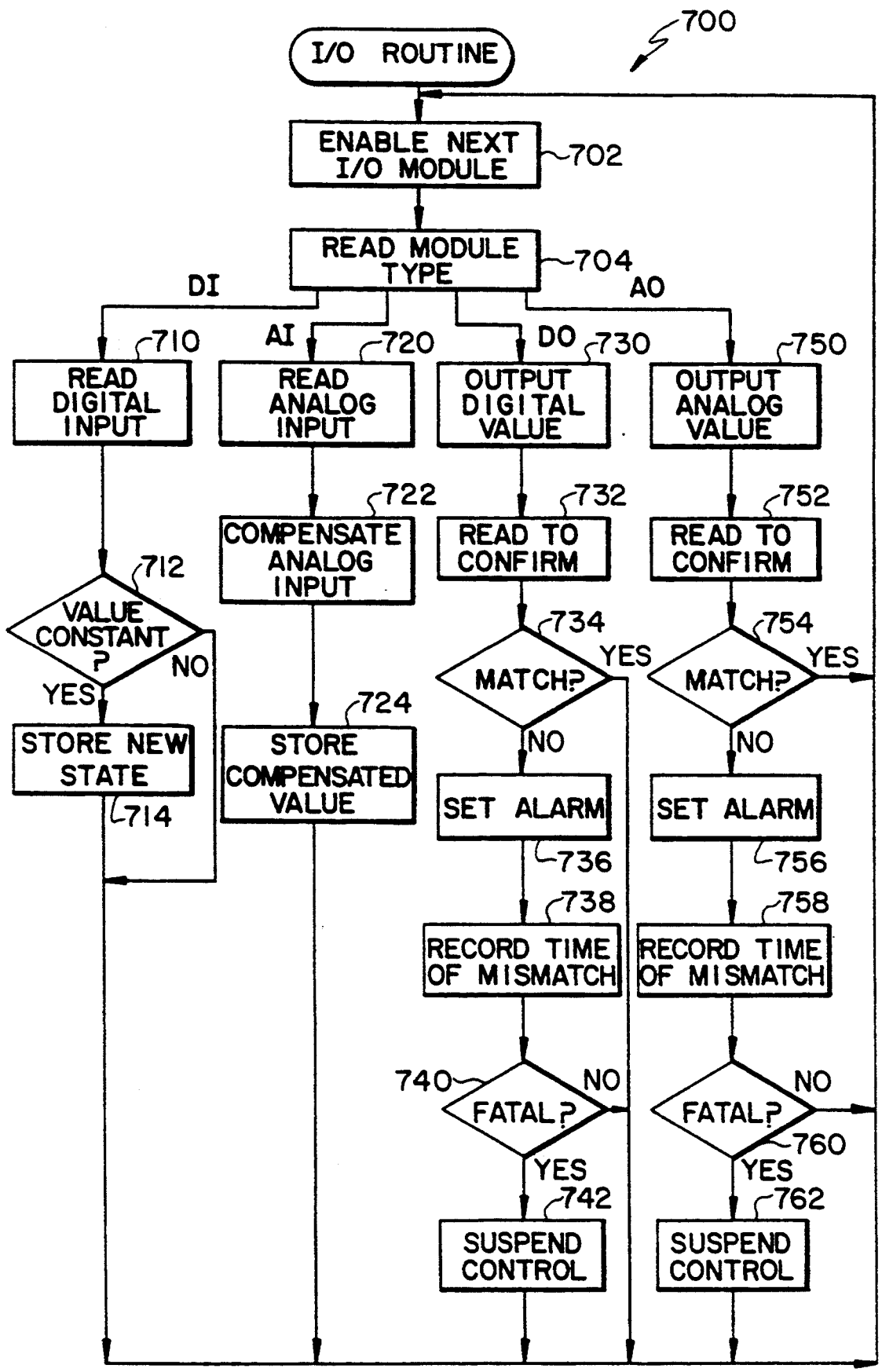
FIG. 17 is a flowchart of an I/O routine shown schematically in FIG. 11.

Referring to FIG. 17, the I/O routine 700 begins execution at step 702, during which one of the I/O modules 68 which is connected to the microprocessor 40 is enabled. This is accomplished by the transmission of an enable signal from the microprocessor 40 to the buffer circuit of the I/O module 68. This enable signal is also referred to herein as a code-request signal since it causes the buffer to transmit the four-bit binary code indicating which type of I/O circuit 60 the microprocessor 40 is communicating with.

At step 704, the buffer transmits the four-bit binary code, indicating the type of I/O module, and the microprocessor 40 reads that code to ensure that the proper communication protocol is used since each of the four types of I/O modules 68 has a unique communication protocol.

If the code was 0000, which corresponds to a digital input circuit, steps 710–714, which define the communication protocol uniquely associated with a digital input circuit, are performed. At step 710, the microprocessor 40 reads the digital input on the line 128 (FIG. 6). At step 712, the microprocessor 40 determines whether the digital input is constant for a predetermined period of time. Step 712 is performed to ensure that transient signals are ignored. If the signal value was constant, the program branches to step 714 where the new value of the digital input is stored. If the value was not constant, the transient value is not stored and step 714 is skipped. The program then branches back to step 702 so that the microprocessor 40 can communicate with the next I/O module 68.

If the binary code of step 704 corresponded to an analog input circuit, steps 720–724 are performed. At step 720, the microprocessor 40 reads the analog input by reading the line 198 connected to the DO output of the A/D converter 180 (FIG. 7).

This analog input (which is in multi-bit binary form) is then compensated based upon the current temperature reading of the temperature transducer circuit 64. The amount of compensation is based on the gain characteristics of the analog input circuit 60a with temperature. The compensation could be a linear compensation with temperature or a more complex function. In the latter case, compensation data could be stored in a lookup table in a ROM.

Since the temperature inside the housing of the controller 22 would change relatively slowly, it is not necessary that the microprocessor 40 read the temperature signal from channel 0 of the A/D converter 370 (FIG. 10) each time the I/O routine 700 is executed. It would be sufficient to read the temperature signal at a more infrequent rate and store the results in memory for use each time the I/O routine 700 is executed.

At step 724, the compensated analog input value is stored in memory. The program then branches back to step 702 where the next I/O module 68 is enabled.

If the binary code of step 704 corresponded to a digital output circuit, steps 730–742 are performed. At step 730, the microprocessor 40 outputs a digital value to the I/O module 68. This is accomplished by transmitting either a binary one or a binary zero to the D flip-flop 220 via the line 222 (FIG. 8).

At step 732, the microprocessor 40 reads the line 266 (FIG. 8) to determine whether the digital output circuit 60d provided the correct output to the I/O device 34. This is accomplished at step 734 by comparing the binary value received on the line 266 with the binary value that was transmitted on the line 222.

If the two binary values match, indicating that the output was correct, then the program branches back to step 702. If the values do not match, an alarm is set at step 736. The time of the mismatch is then recorded in memory at step 738. The particular I/O module 68 which failed in this manner can also be recorded.

At step 740, if the mismatch is not fatal, the program branches back to step 702. Whether or not a mismatch is "fatal" is determined by a flag set by the operator. The setting of the fatal flag may depend, for example, on the relative importance of each particular I/O module 68 and/or the particular process being controlled.

If the mismatch is fatal, at step 742 control of the process is suspended, and the digital output value for that I/O module 68 may default to a particular fail state specified by the operator. For example, depending on the application, it may be desirable to have a solenoid-operated valve fail either open or closed.

If the binary code of step 704 corresponded to an analog output circuit, steps 750–762 are performed. At step 750, the microprocessor 40 outputs an analog value (in multi-bit binary form) to the I/O module 68 via the line 302 (FIG. 9).

At step 752 the microprocessor 40 reads the value of the multi-bit binary signal on channel 1 of the A/D converter 370 (FIG. 10). This value should correspond to the multi-bit binary value that the microprocessor 40 transmitted to the analog output circuit 60b via the line 302.

At step 754, if the two binary values are within a relatively small number of binary counts of each other, they are considered to match. If there is a match, the program branches back to step 702 where the next I/O module 68 is written to or read from by the microprocessor 40.

If the values do not match, an alarm is set at step 756. The time of the mismatch is then recorded at step 758. The particular I/O module 60 which failed can also be recorded.

At step 760, if the mismatch is not fatal, the program branches back to step 702. If the mismatch is fatal, at step 762 control of the process is suspended, and the analog output value for that I/O module 60 may default to a particular fail value specified by the operator.

It should be appreciated that the basic I/O routine 700 described above could be implemented in various ways. For example, after the initial classification of each of the I/O modules 68 upon power up, the microprocessor 40 could divide all of the I/O modules 68 into four groups based upon their type. Each of the groups could then be read in order, all of the digital input circuits being read first, then all of the analog input circuits being read next, etc. In this case, the step 704 of FIG. 17 would be a verification step to verify that the particular I/O module 68 belonged in the group currently being tested.

Alternatively, instead of dividing all the I/O modules 68 into groups based upon their classification, the microprocessor 40 could communicate with the I/O modules 68 based upon their positions on the I/O board 70. Thus, the microprocessor 40 could start at one end of the I/O board 70 and address each I/O module 68 in succession according to its physical location. In this case, each successive I/O module 68 could be a different type, and the step 704 would be a branch step, branching to a different one of the four basic communication protocols for each successive I/O module 68.

Of course, the four basic types of I/O modules 68 described above are not the only types that could be utilized. Other types of modules, such as pulse input modules specifically designed for inputting trains of digital pulses, could be used. Alternatively, the controller 22 may be used only to monitor process control conditions, in which case the controller 22 would not require either analog or digital output circuits.

A/D CONVERTER CHECK ROUTINE

During operation of the controller 22, the A/D converter 180 (FIG. 7) within each analog input circuit 60a is periodically checked for accuracy, such as every 10 seconds for example. This is accomplished by having the A/D converter 180 convert a known reference voltage to a multi-bit binary number, and then determining whether that binary number is within an expected range of binary numbers. This A/D check routine may be part of the system task performed at step 404 (FIG. 11), for example.

For example, assume that the A/D converter 180 converts a voltage between 0 and five volts to a 14-bit binary number. The binary number would be expected to be 0 when the voltage was zero and 4096 when the voltage was five volts. If the reference voltage provided to the A/D converter 180 during the check was precisely 2.5 volts, the expected binary output of the converter 180 would be 2048. Since very small fluctuations are expected, the binary output could be compared to make sure it is within a predetermined range by comparing it with a low range value of 2044 and a high range value of 2052. If the binary output fell within this range, the A/D converter 180 would be considered to be working properly.

Figure 18:
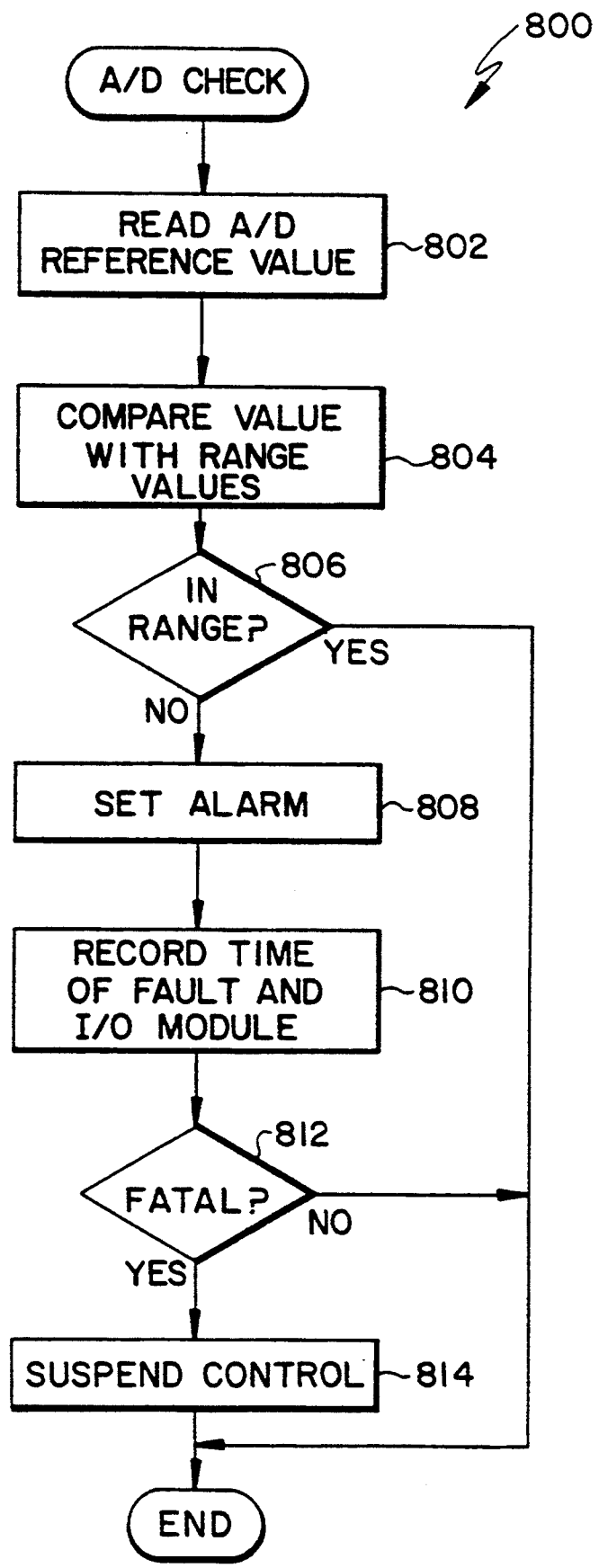
FIG. 18 is a flowchart of an A/D check routine periodically executed during operation of the process controller.

A flowchart of an A/D converter check routine 800 is shown in FIG. 18. As described above, the check routine 800 is periodically performed to check the A/D converter 180 within each of the analog input modules 68a. The routine 800, which illustrates the checking of one A/D converter 180, would be repeated to check each converter 180. The A/D converters 180 could be checked in any order and at any desired rate.

The check routine begins at step 802 where the A/D reference value is read by the microprocessor 40. This reference value, which is the reference voltage on channel 1 of the A/D converter 180 (FIG. 7), is converted to a multi-bit binary number. At step 804, this binary number is checked to determine whether it is in a predetermined range defined by a lower range value and an upper range value. At step 806, if the binary value is in range, the A/D converter 180 is operating correctly and the routine ends.

If the binary number is not within the range, an alarm is set at step 808. At step 810 the time of the A/D converter fault is recorded as well as the I/O module 68 containing the faulty A/D converter 180. Recording such fault data may be useful since the operator may want to know which historical data may be subject to error. At step 812, if the A/D converter fault is not fatal, the routine ends. If the fault is fatal, then at step 814 control of the process is suspended.

I/O MODULE CHANGE ROUTINE

Figure 19:
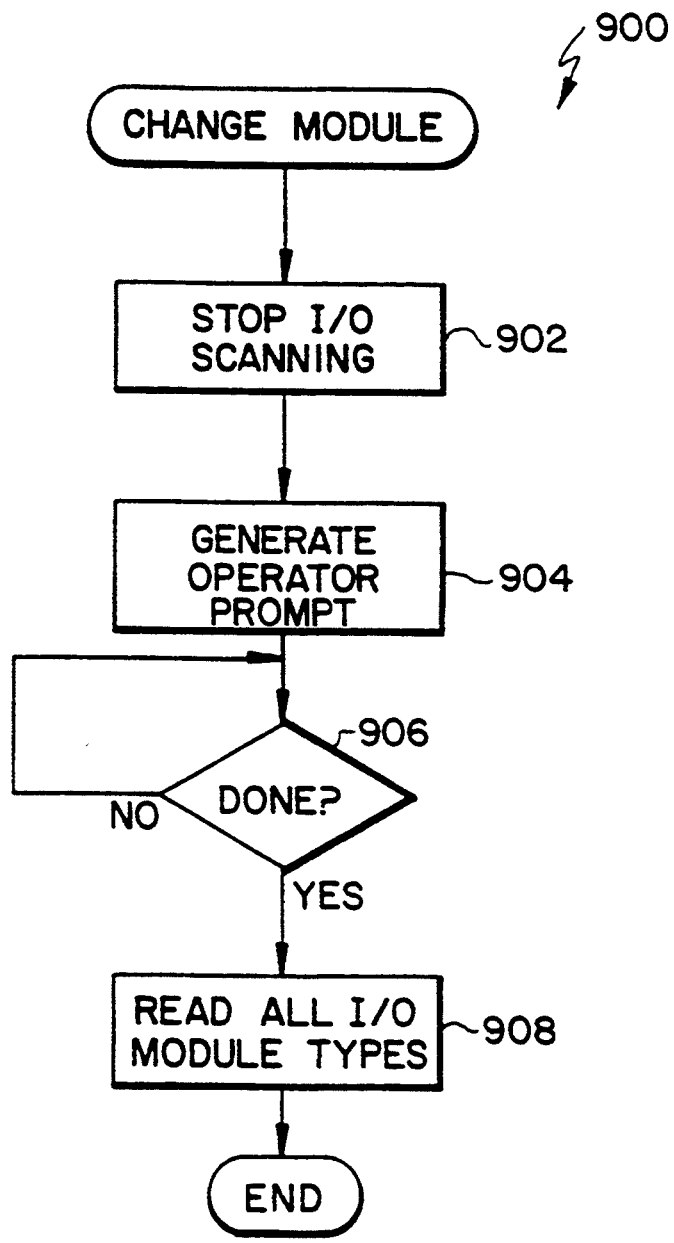
FIG. 19 is a flowchart of a change module routine that allows an operator to change the positions of the I/O modules within the process controller.

During operation of the controller 22, the operator may install additional I/O modules 68 onto the I/O board 70, remove modules 68 from the I/O board 70, change the positions of the existing modules 68, or any combination of the foregoing. This is accomplished with the use of an I/O module change routine 900, which is illustrated in FIG. 19. The operator initiates the change routine 900 by entering a module-change request via a keyboard (not shown) coupled to the controller 22.

Referring to FIG. 19, upon entry of the operator's module-change request, at step 902 the execution of the I/O routine 700 is suspended. At step 904, a visual prompt is generated on the controller display (not shown) instructing the operator to make the desired I/O module 68 changes.

The routine remains at step 906 until the operator has made the desired module changes. The completion of the changes is indicated by the operator by entering a module change-complete command. Upon receiving the change-complete command, the program branches to step 908 where all of the I/O modules 68 are read to determine the new module types. Step 908 is the same process that is performed upon power up of the controller 22 as described above.

Many modifications and alternative embodiments of the invention will be apparent to those of ordinary skill in the art in view of the foregoing description of the preferred embodiment. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A process controller for interfacing with a plurality of I/O devices, said process controller performing a number of tasks related to the operation of the I/O devices, said process controller comprising:
   a plurality of I/O circuits that are connectable to a plurality of I/O devices;
   a processor coupled to periodically communicate with said I/O circuits, said processor periodically executing a plurality of tasks related to the operation of the I/O devices in a plurality of successive time slots;

means coupled to said processor for establishing said plurality of successive time slots, each of said plurality of tasks being allocated to a different one of said successive time slots;

means for determining whether a first of said tasks was completely performed during a first time slot to which said first task was allocated; and means for executing a second of said tasks during said first time slot if said first task was completely performed during said first time slot.

2. A process controller as defined in claim 1 additionally comprising means for allocating at least one time slot to the performance of a task that may be preempted by another task having a high priority than said task.

3. A process controller as defined in claim 1 wherein said I/O circuits comprise a digital input circuit, a digital output circuit, an analog input circuit, and an analog output circuit.

4. A process controller as defined in claim 1 wherein said tasks include an I/O routine during which communication between said processor and said I/O circuits is performed.

5. A process controller as defined in claim 4 wherein said tasks additionally include:
   a communication routine for communication with a host computer at a location remote from the process controller;
   a database routine for updating a database in the process controller: and
   a process control routine related to the performance of process control functions.

6. A process controller as defined in claim 1 wherein said time slots are initiated by interrupts.

7. A process control method performed by a process controller in which a plurality of tasks related to the communication with a plurality of I/O devices are performed, said method comprising the steps of:
   (a) generating a plurality of successive time slots of predetermined duration in which a plurality of tasks are executed, each of said plurality of tasks being allocated to a different one of said time slots;
   (b) executing one of said plurality of tasks during one of said time slots;
   (c) determining if the execution of said one task is completed before the end of said one time slot; and
   (d) if the execution of said one task in said step (b) is completed before the end of said one time slot, executing another of said plurality of said tasks during said one time slot.

8. A method as defined in claim 7 wherein said plurality of tasks include:
   an I/O routine;
   a communication routine for communication with a host computer at a location remote from the process controller;
   a database routine for updating a database in the process controller; and
   a process control routine related to the performance of process control functions.

9. A process control method performed by a process controller in which a plurality of tasks related to the communication with a plurality of I/O devices are performed, said method comprising the steps of:
   (a) generating a plurality of successive time slots of predetermined duration;
   (b) executing said plurality of tasks during said plurality of time slots;
   (c) determining if the execution of a first of said tasks is interrupted at the end of a first of said time slots before said first task is completed;
   (d) if the execution of said first task is interrupted at the end of said first time slot before said first task is completed, storing data relating to said first task in a memory portion dedicated exclusively to said first task so that the performance of said first task can be resumed during a subsequent time slot
   (e) determining if the execution of a second of said tasks is interrupted at the end of a second of said time slots before said second task is completed; and
   (f) if the execution of said second task is interrupted at the end of said second time slot before said second task is completed, storing data relating to said second task in a memory portion dedicated exclusively to said second task so that the performance of said second task can be resumed during a subsequent time slot.

10. A method as defined in claim 9 wherein the number of time slots generated in said step (a) is predetermined.

11. A process control method performed by a process controller in which a plurality of tasks related to the communication with a plurality of I/O devices are performed, said method comprising the steps of:
   (a) generating a predetermined number of successive time slots of predetermined duration, each of said time slots being allocated for the performance of one of said plurality of tasks, each of said time slots being of equal duration;
   (b) during one of said successive time slots, performing the task allocated to that time slot;
   (c) determining whether said task was completely performed during said one time slot;
   (d) determining the priority of one of said plurality of tasks; and
   (e) if said task was completely performed during said one time slot as determined at said step (c), performing another of said tasks during said one time slot based on the priority determining in said step (d).

12. A method as defined in claim 11 wherein one of said tasks is allocated to more than one of said time slots.

13. A method as defined in claim 11 wherein each of said time slots is reserved for a respective one of said tasks.

14. A method as defined in claim 11 wherein the performance of one of said tasks allocated to one of said time slots may be preempted by another of said tasks having a higher priority.

15. A method as defined in claim 11 wherein said time slots are initiated by interrupts.

16. A method as defined in claim 11 additionally comprising the step of:
   (c) if the performance of one of said tasks is completed during the time slot allocated to said one task, performing another of said tasks during said time slot.

17. A method as defined in claim 11 additionally comprising the steps of:
   (c) if the performance of one of said tasks is completed during the time slot allocated to said one task, determining whether at least two tasks were not completed during their allocated time slots;

(d) if there are at least two uncompleted tasks as determined in said step (c), determining which of said two tasks has higher priority; and (e) performing said task having higher priority during the time slot allocated to said one task.

18. A process control method performed by a process controller in which a plurality of tasks related to the communication with a plurality of I/O devices are performed, said method comprising the steps of:

(a) generating a predetermined number of successive time slots of predetermined duration, each of said time slots being allocated for the performance of a respective one of said plurality of tasks;

(b) determining the priority of one of said plurality of tasks; and (c) executing of said plurality of tasks during one of said time slots based upon the priority of said one task as determined in said step (b).

19. A method as defined in claim 18 wherein the performance of one of said tasks allocated to one of said time slots may be preempted by another of said tasks having a higher priority.

20. A method as defined in claim 18 wherein each of said time slots is reserved for a respective one of said tasks.

21. A method as defined in claim 18 additionally comprising the steps of:

(d) determining if the execution of said one task is completed during said step (c); and (e) if the execution of said one task is completed during said step (c), executing another one of said tasks during said one time.

22. A method as defined in claim 18 additionally comprising the steps of:

determining if the performance of said one task is interrupted at the end of said one time slot before said one task is completed; and (e) if the performance of said one task is interrupted at the end of said one time slot before said one task is completed, storing data relating to said one task in memory so that the performance of said one task can be resumed during a subsequent one of said time slots.

23. A method as defined in claim 18 additionally comprising the steps of:

(d) determining whether at least two tasks were not completed during their allocated time slots;

(e) if there are at least two uncompleted tasks as determined in said step (d), determining which of said two tasks has high priority; and (f) performing the one of two said tasks having higher priority.

24. A process controller for interfacing with a plurality of I/O devices, said process controller performing a number of tasks related to the operation of the I/O devices, said process controller comprising:

a plurality of I/O circuits that are connectable to a plurality of I/O devices;

a processor coupled to periodically communicate with said I/O circuits, said processor periodically executing a plurality of tasks related to the operation of the I/O devices during a plurality of successive time slots of predetermined duration, each of said plurality of tasks having a priority thereto;

means for determining the priority assigned to one of said tasks; and means for performing one of said tasks during one of said time slots based upon the priority determined by said determining means.

25. A process controller as defined in claim 24 wherein said means for determining priority comprises a computer program.

26. A process controller for interfacing with a plurality of I/O devices, said process controller performing a number of tasks related to the operation of the I/O devices, said process controller comprising:

a plurality of I/O circuits that are connectable to a plurality of I/O devices;

a processor coupled to periodically communicate with said I/O circuits, said processor periodically executing a plurality of tasks related to the operation of the I/O devices; and random-access memory means coupled to said processor, said memory means being logically organized into a plurality of portions, each of said memory portions being dedicated exclusively to a respective one of said tasks so that the execution of a plurality of said tasks can be temporarily suspended and resumed at a later time.

27. A process controller as defined in claim 26 wherein each of said memory portions includes a stack.

28. A process controller as defined in claim 26 wherein each of said memory portions includes a location for storing data relating to the status of execution of the task associated with that memory portion.

* * * * *

UNITED STATES PATENT AND TRADEMARK OFFICE
CERTIFICATE OF CORRECTION

PATENT NO. : 5,339,425

DATED : August 16, 1994

INVENTOR(S) : Vanderah et al.

It is certified that error appears in the above-identified patent and that said Letters Patent is hereby corrected as shown below:

Column 13, line 16 "which the (" task" should be --which the task--

Column 21, line 17 "high" should be --higher--

Column 22, line 44 "determining" should be --determined--

Column 23, line 16 "executing of said" should be --executing one of said--

Column 23, line 33 "said one time." should be --said one time slot.--

Column 23, line 36 "determining if the" should be --(d) determining if the--

Column 24, line 3 "tasks has high" should be --tasks has higher--

Column 24, line 17 "a priority thereto" should be --a priority assigned thereto--

Signed and Sealed this

Fourth Day of July, 1995

Attest:

BRUCE LEHMAN

Attesting Officer

Commissioner of Patents and Trademarks